Aug. 4, 1959    P. MAKER    2,897,638
PROCESS CONTROL APPARATUS
Original Filed Sept. 2, 1954    9 Sheets-Sheet 1

INVENTOR.
Paul Maker
BY
Robert S. Toperzer  Atty.

INVENTOR.
PAUL MAKER
BY Robert S. Toperzer
ATTORNEY

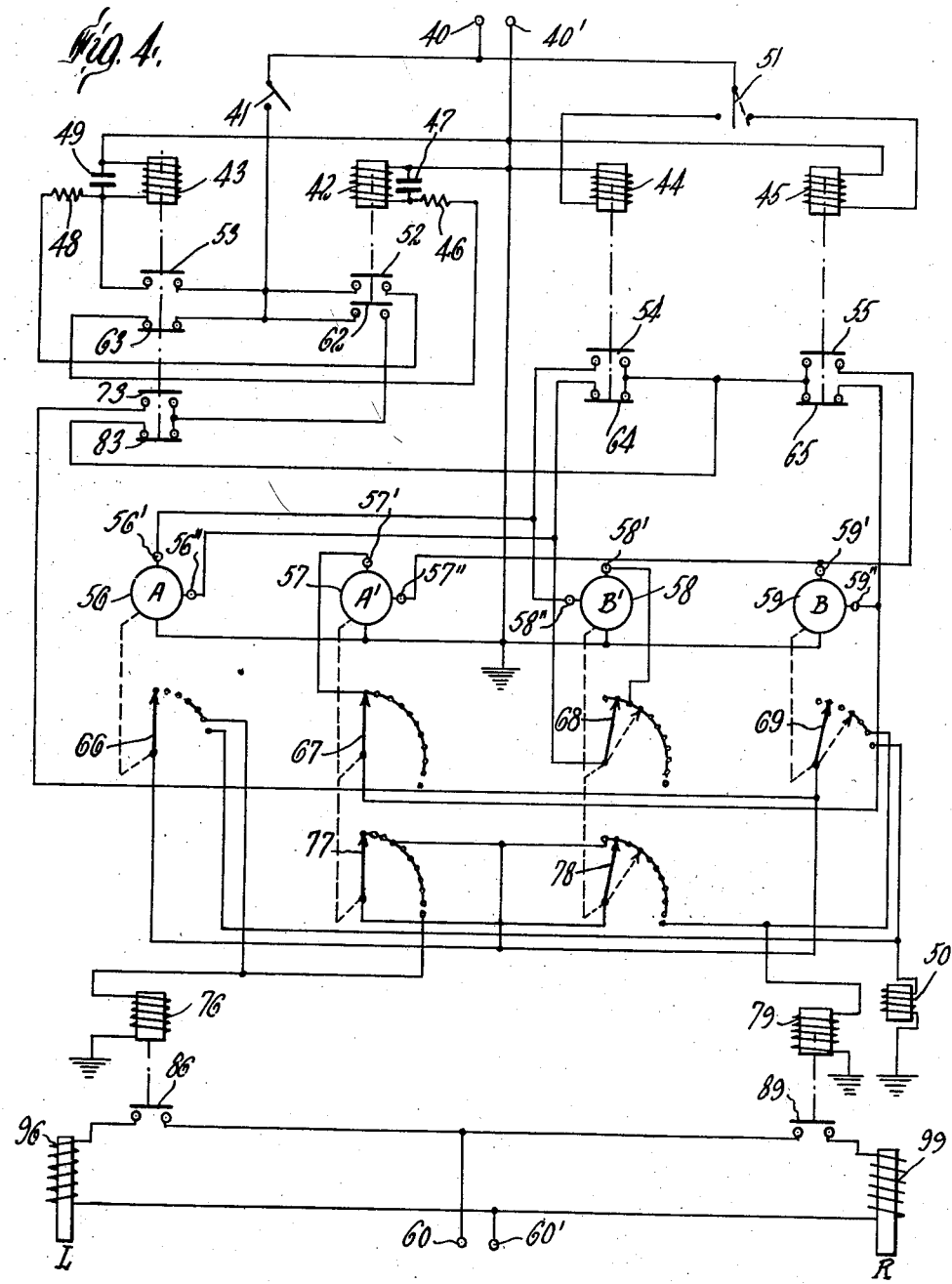

INVENTOR.
PAUL MAKER
BY Robert S. Toperzer
ATTORNEY

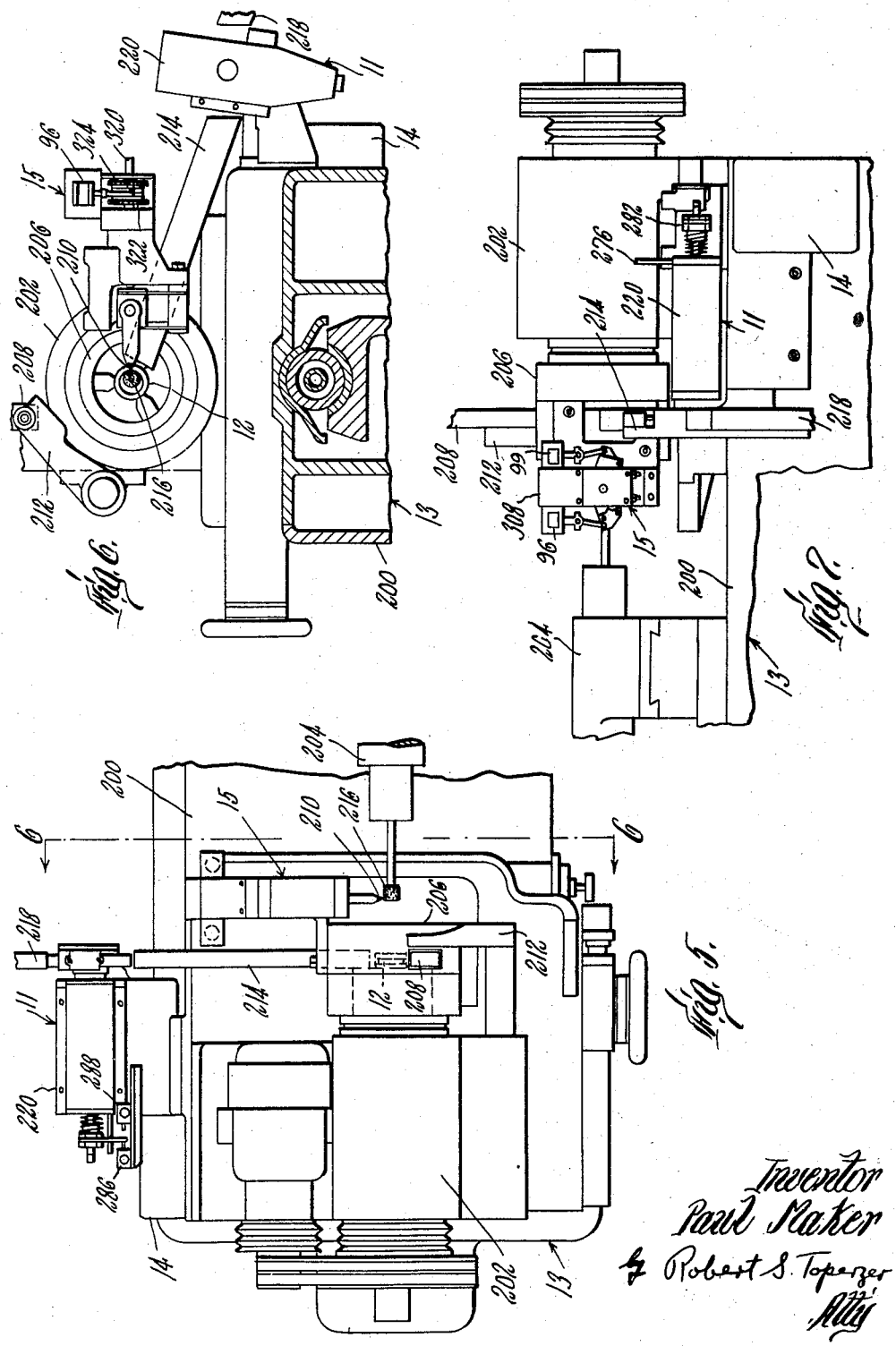

Aug. 4, 1959    P. MAKER    2,897,638
PROCESS CONTROL APPARATUS
Original Filed Sept. 2, 1954    9 Sheets-Sheet 6

Inventor
Paul Maker
by Robert S. Toperzer
Atty

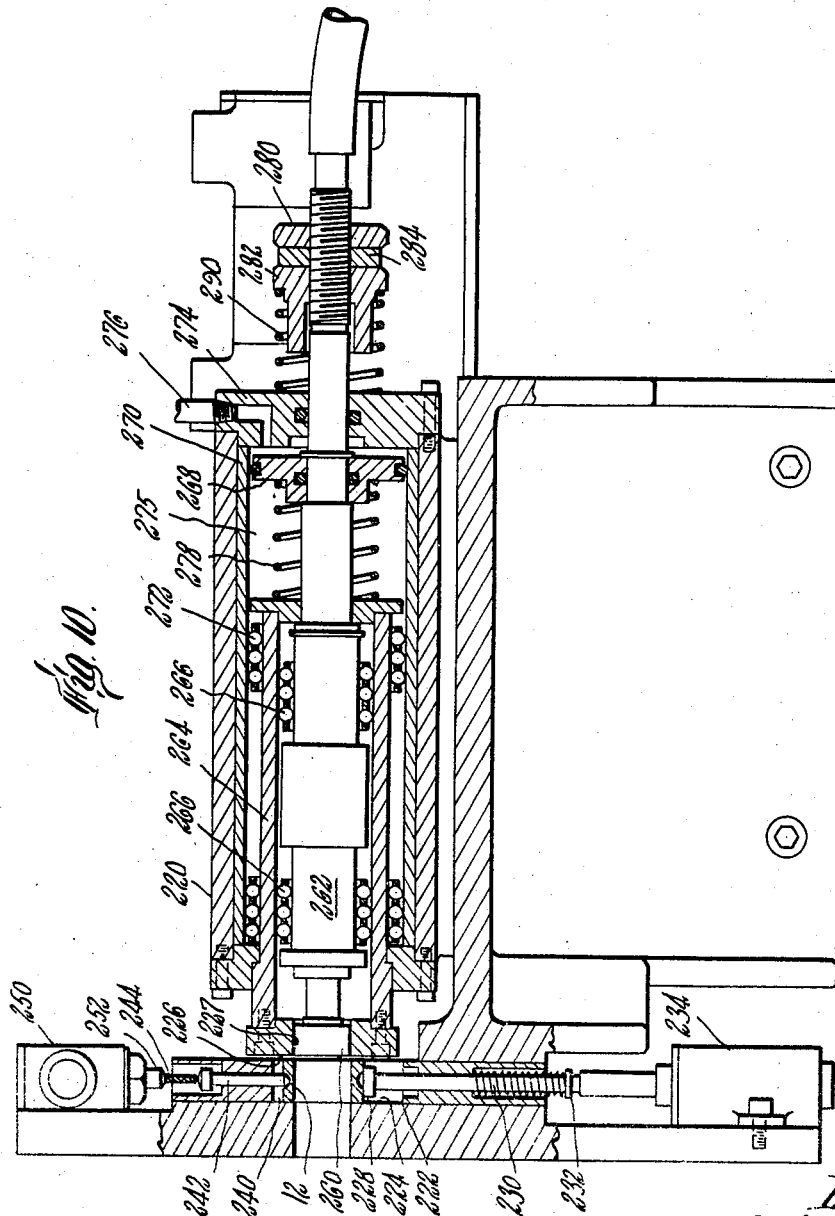

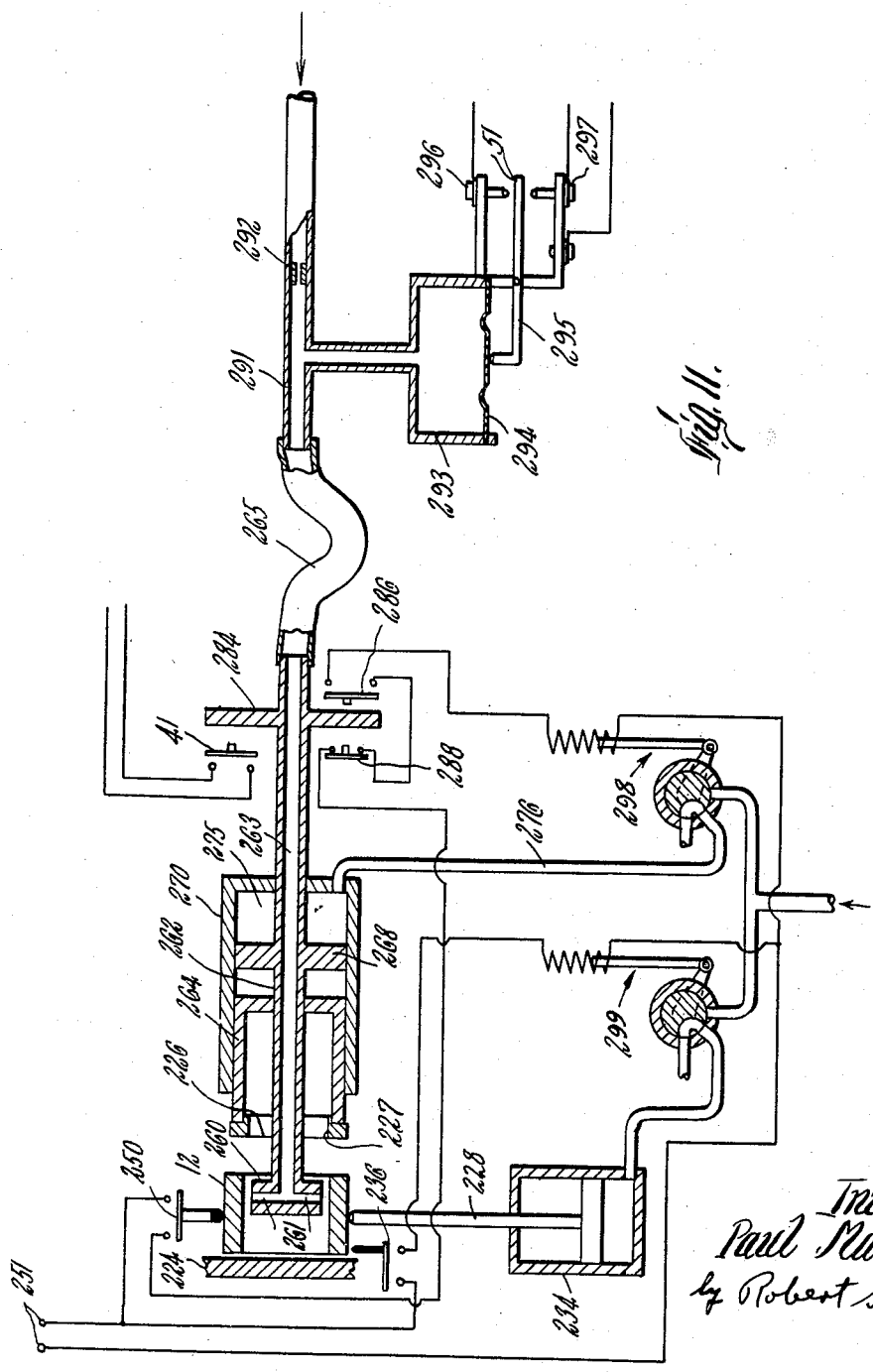

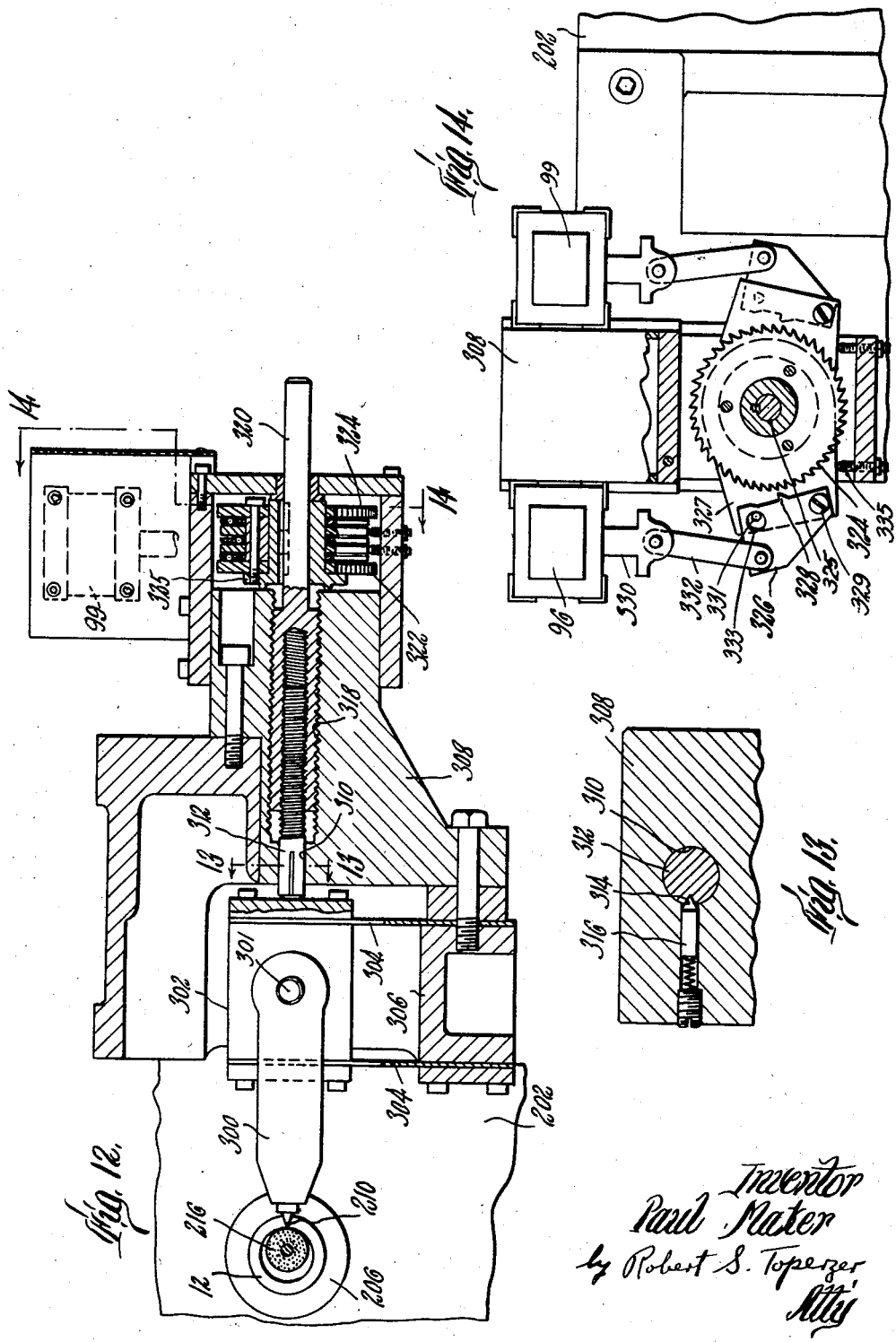

United States Patent Office 2,897,638
Patented Aug. 4, 1959

2,897,638

PROCESS CONTROL APPARATUS

Paul Maker, Birmingham, Mich., assignor to Bryant Chucking Grinder Co., Springfield, Vt., a corporation of Vermont Continuation of applications Serial No. 453,921, September 2, 1954, and Serial No. 491,506, March 1, 1955. This application June 13, 1956, Serial No. 591,161

31 Claims. (Cl. 51—165)

This invention relates generally to process control apparatus and more particularly to novel apparatus for statistically controlling a process in a manner whereby a more uniform product is obtained. Such apparatus is disclosed in my copending application, Serial No. 453,921, filed September 2, 1954; and an improvement thereof is disclosed in my copending application, Serial No. 491,506, filed March 1, 1955, now abandoned. This application is a continuation of the aforementioned copending applications for the purpose of combining their respective subjects matter.

It has been determined that articles of manufacture produced in substantially the same manner exhibit characteristic variations which to some extent are comparable with the variations to be found among natural objects of a particular class. That is, to the extent that characteristics of articles are subject to change in a manufacturing process by factors which are essentially random in nature, characteristic variations occur which follow a so-called normal statistical distribution curve. Consequently, one may predict on the basis of the past history of the process, the number of finished articles of a group which will have a particular range of sizes, for example, in much the same way as one may predict the percentage of infants of a group whose heights will exceed six feet at maturity.

Certain characteristics of the output of many manufacturing processes, however, are subject to changes caused by factors which may be controlled, as well as to changes caused by factors which are essentially random in nature. In such processes, it is often necessary to exercise some mode of control adapted continuously to conform characteristics of the output as closely as possible or at least within some tolerance range. Heretofore it has been found exceedingly difficult to provide a mode of control which will satisfactorily accomplish this result because of the many random factors present. If, for example, a deviation from a desired size of the size of a single finished article in a series of articles comprising the output is taken to indicate that a control adjustment is required, an entirely erroneous adjustment may be made, since the deviation in size of such single article may have been entirely random. That is, the undesired change in size of such article may have been caused by a random factor which will recur only sporadically or which will not recur at all. Thus, any control adjustment based on a single article may well result in increasing the size error of subsequent articles, rather than decreasing it as is of course desired.

To overcome this difficulty, it has been proposed that a controlled characteristic of each finished article in a relatively large group of articles be measured, and that the individual measurements be manually plotted in the form of a statistical distribution curve. Then, by reference to such a curve, the median axis of which indicates the true average characteristics such as size, a corrective control adjustment may be initiated as required to conform the average size of future articles to the desired size. It is apparent, however, that this procedure is exceedingly complex, time consuming, and ill-suited for operation by automatic means. Furthermore, in order automatically to carry out such a procedure not only is there required a type of measuring device capable of discriminating between relatively small increments, for example, small differences in sizes, but also one which provides indications of a relatively large number of different sizes to provide sufficient information for accurate plotting of the distribution curve. With certain types of processes such as precision machining processes capable of producing finished articles within a tolerance of a few ten thousandths of an inch, the problem of measurement alone appears to be almost insurmountable since such a large number of different measurement ranges would be necessary within the already narrow tolerance range in order to determine a distribution curve. Thus, measuring devices capable of an accuracy of perhaps ten times that of the presently used devices would be required, which devices themselves would be difficult to provide in the present state of the art, at least as a part of a practical manufacturing process capable of producing hundreds of finished articles an hour from a single automatic machine as distinguished from closely controlled laboratory conditions with no restriction as to time.

Even assuming that the above-mentioned obstacles could be overcome, a further inherent disadvantage of the scheme lies in the relatively large number of articles required to be measured accurately to establish a distribution curve from which the necessity of a corrective control adjustment can be determined. Thus, if a non-random error is occurring during the plotting of the curve, not only will the plotted curve itself be inaccurate, but many of the later articles of the measured group may already have deviated so much from the desired size that they are unacceptable.

Accordingly, it is an object of the present invention to provide process control apparatus of a simplified nature especially well adapted for closely conforming characteristics of the output product of a manufacturing process in accordance with measured deviations of characteristics of such product and automatically to control such process as, for example, by means of a novel computer for statistically analyzing said deviations to counteract only those factors tending to cause non-random deviations from the desired characteristics of the product.

Thus, the process control apparatus of the invention is capable of wide use in a variety of industries for controlling manufacturing processes having outputs either of the continuous type wherein a product is continuously produced, as in chemical industries, for example, or of the intermittent type wherein products such as individual articles are intermittently produced. Typical examples of the latter type of processes arise in the high speed production of finished articles by means of automatic machine tools, wherein an article to be finished may be loaded in the machine, operated upon as by cutting or grinding tools, and then ejected from the machine, the entire cycle for each article being carried out automatically within a few seconds.

For the purpose of illustrating a specific application of the invention, its embodiment in an automatic internal grinding machine, such as that shown, for example, in U.S. Patents 2,429,830, 2,502,862, and 2,671,293, will be described and illustrated herein, the machines of said patents being modified in accordance with the present invention by the addition thereto of a novel automatic machine tool controller and novel automatic gaging means for measuring deviations of articles produced by the machine, as well as by the use therewith of a novel statistical computer for statistically analyzing said deviations and providing an output signal to said machine tool controller to shift the tool relative to the workpiece in a direction to correct for the deviation.

The novel features of the invention, together with further objects and features thereof will be more readily understood when considering in connection with the accompanying drawings in which.

Figure 2:
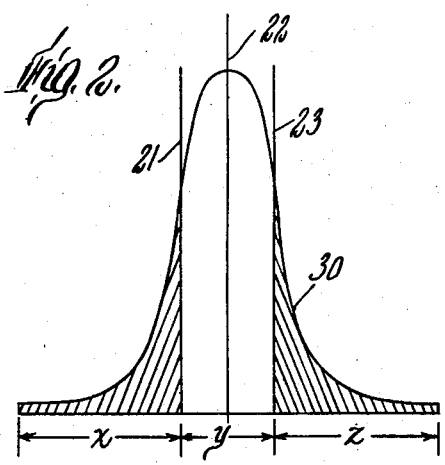
Figure 3:
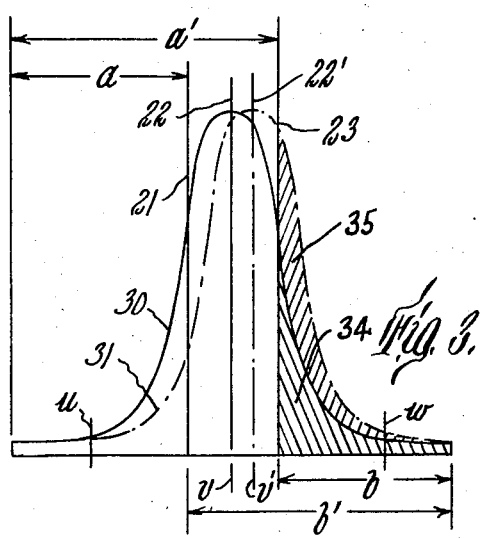
Figure 2A:
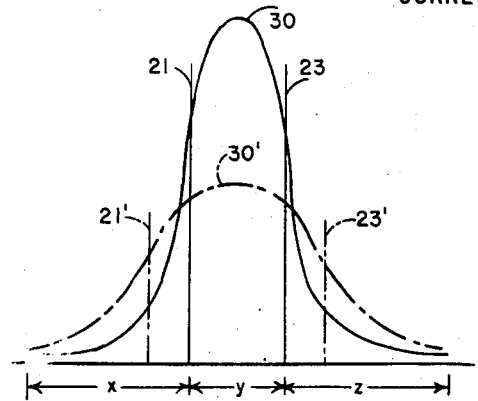
Figure 2B:
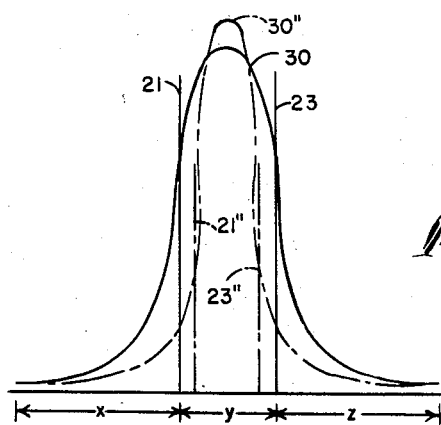
Figure 4A:
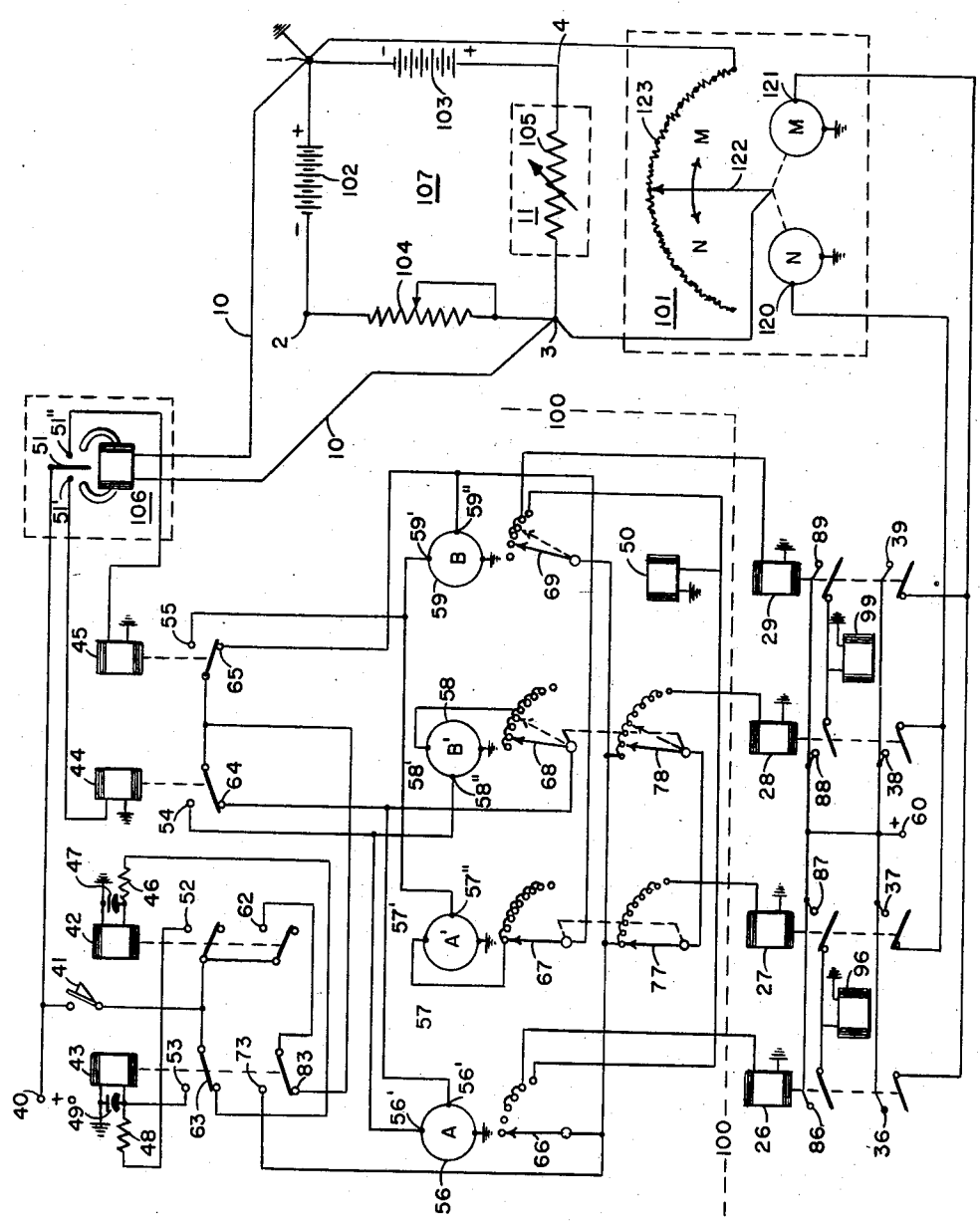
Figure 9:
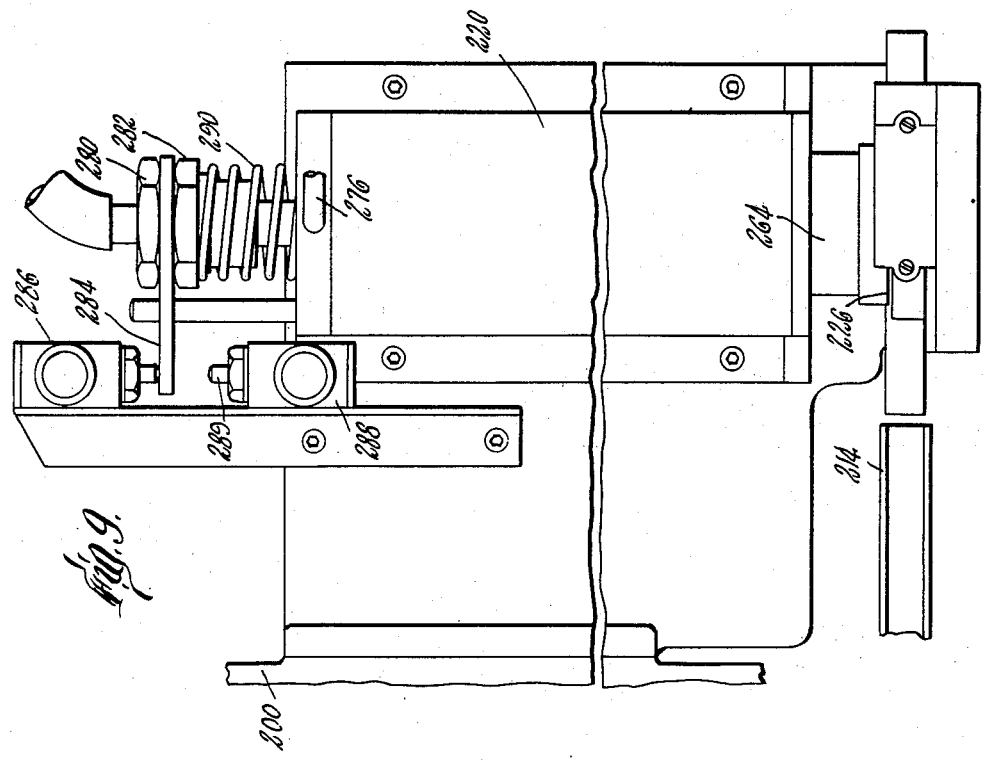
Figure 8:
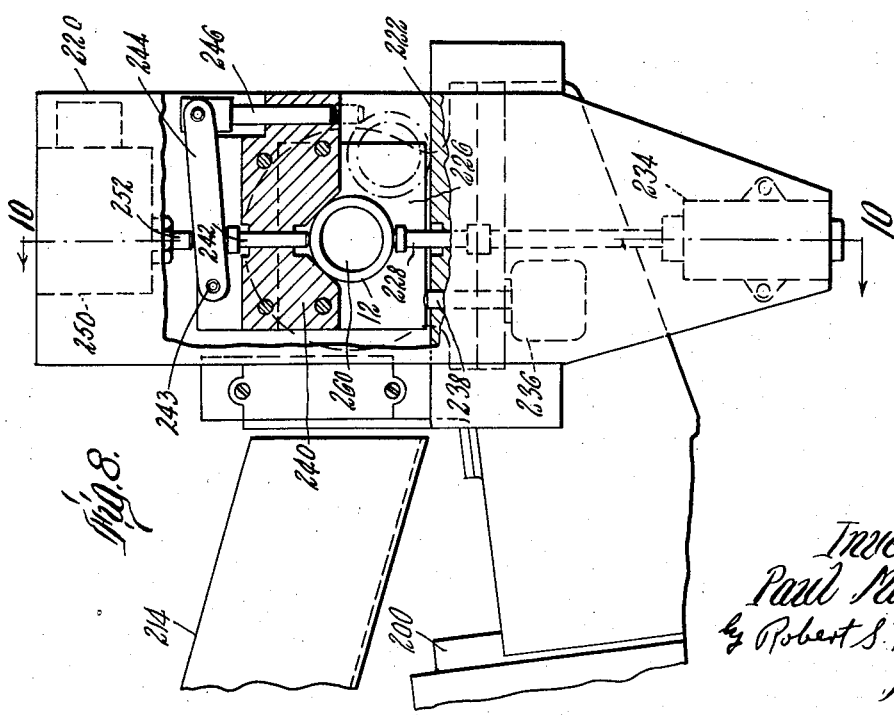

Figs. 2, 2A, and 2B are normal distribution curves associated with the processes to be controlled;

Fig. 3 illustrates two normal distribution curves each like the one shown in Fig. 2 but having their median axes displaced with respect to one another;

Fig. 4 is a circuit diagram of the novel computer portion of apparatus according to this invention;

Fig. 4A is a circuit diagram similar to that of Fig. 4 with the addition of the auxiliary means to vary the positions of the control points also in accordance with the invention;

Fig. 5 is a plan view partly broken away of an internal grinding machine embodying the present invention;

Fig. 6 is an end elevational view of the machine of Fig. 5;

Fig. 7 is a side elevational view of the machine of Fig. 5;

Fig. 8 is an enlarged end view partly in cross-section of the novel automatic gaging means of the machine of Fig. 5;

Fig. 9 is a plan view of the means of Fig. 8;

Fig. 10 is a side cross-sectional view of the means of Fig. 8;

Fig. 11 is a schematic view of the means of Figs. 8, 9, and 10 showing its electrical and fluid control system;

Fig. 12 is an enlarged cross-sectional side view of the novel machine tool controller of the machine of Figs. 5, 6, and 7;

Fig. 13 is a cross-sectional view of the means of Fig. 12 taken on the line 13—13 of Fig. 12; and Fig. 14 is an end cross-sectional view of the means of Fig. 13.

Figure 1:
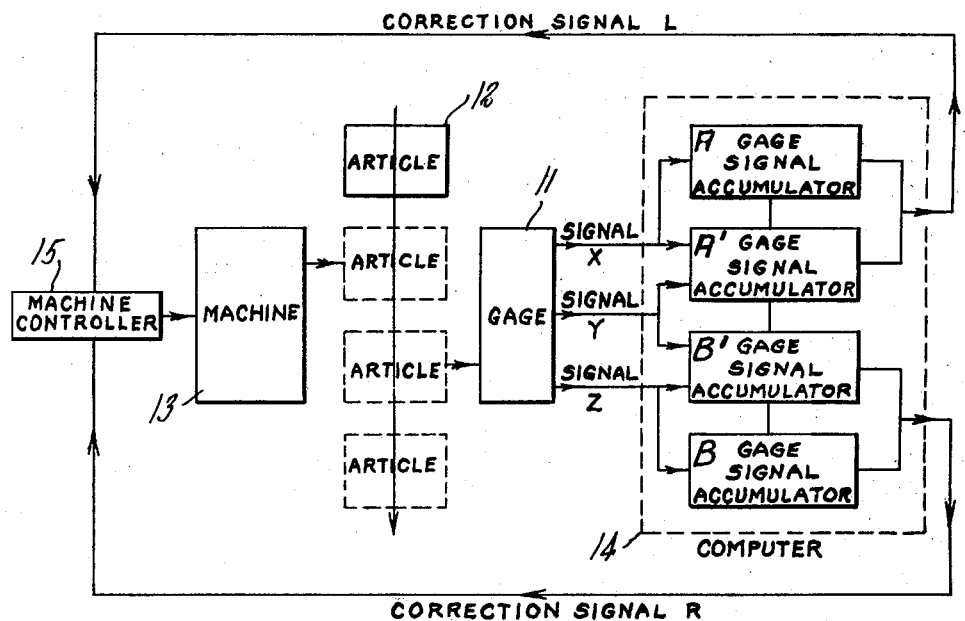
Fig. 1 is a block diagram of the process control apparatus according to this invention.

Referring now to the drawings, and more particularly to Fig. 1 thereof, the process control apparatus of this invention in general includes as its major components a machine generally designated 13 adapted to be controlled by a controller 15 to produce as an output products or articles 12 having certain characteristics such as sizes conforming to a normal statistical distribution curve (Fig. 2); a measuring means or gage generally designated 11 adapted to provide indications of the sizes or other characteristics of said articles 12; and a computer generally designated 14 actuated by said gage for statistically analyzing said gage indications in accordance with said distribution curve and providing a corrective signal for controlling machine 13. In accordance with each size or other characteristics of articles 12 measured, gage 11 supplies one of three signals, herein referred to as X, Y, and Z in the alternative to the computer 14, each of such three signals corresponding to one of three ranges of sizes within said distribution curve as hereinafter more fully explained. Computer 14 in essence comprises four gage signal responsive memory devices or accumulators A, A', B', and B, each of which is adapted to accumulate a predetermined sequence of signals from gage 11, preferably a predetermined number of consecutive signals, although other predetermined sequences can be used. To this end, signal X is supplied to accumulators A and A', signal Y is supplied to accumulators A' and B', and signal Z is supplied to accumulators B' and B. Each time an article 12 is measured, and no signal is received by one or more of the accumulators A, A', B', and B, however, those accumulators not receiving a signal are adapted to clear or, in other words, to begin counting anew. A connection between the accumulators is provided for this latter purpose.

When the respective predetermined numbers of consecutive signals have been received by either accumulator A or accumulator A', a correction signal L is produced for transmission to machine controller 15. Similarly, a correction signal R is transmitted to machine controller 15 when the respective predetermined numbers of consecutive signals have been received by either accumulator B or accumulator B'. Machine controller 15 then responds to signals L and R in a manner to provide a corrective adjustment in the process performed by machine 13 whereby the distribution curve thereof will be bodily shifted so that the normal statistical size of future articles 12 will be more nearly equal to a desired size. As will become apparent from the following description of the operation of the apparatus according to this invention, signal R energizes controller 15 in a manner to counteract deviations from the desired size in a positive direction, whereas signal L energizes controller 15 in a manner to counteract deviations from the desired size in a negative direction. In other words, machine controller 15 increases or decreases the average size of future articles according to whether signal L or signal R is received.

In operation, gage 11 provides a signal in the form of an electrical impulse each time an article is measured, the designation of the signal as X, Y, or Z being dependent on the range of sizes into which the article falls. With reference to Fig. 2, which shows a normal distribution curve 30 associated with the process, three ranges of sizes, x, y, and z may be observed. These are defined by lines 21 and 23 which comprise the limits of gage 11. Signal X is produced when the size of the article falls within range x, and similarly signals Y and Z are produced when the sizes of the articles fall within ranges y and z, respectively. The extremities of curve 30 have been terminated abruptly to indicate that only a limited as opposed to an infinite range of sizes will occur, as is the case in most manufacturing processes.

Since lines 21 and 23 are equidistant from the median axis 22 of curve 30, it follows that the shaded areas under the curve in the ranges x and z are equal. Hence, the probability of a gage signal X being produced will be the same as the probability of a gage signal Z being produced, provided that median axis 22 represents the true average size of the articles being manufactured. In this case, the relative probabilities of accumulators A and B receiving gage signals will also be the same, since only signal X is supplied to accumulator A and only signal Z is supplied to accumulator B.

Accumulator A', on the other hand, is supplied with signal Y as well as signal X, and accumulator B' is supplied with signal Y in addition to signal Z. Hence, the probabilities of accumulators A' and B' receiving a gage signal will be equal to each other but much greater than the probability of either accumulator A or accumulator B receiving a gage signal. For this reason, the consecutive numbers of gage signals required to produce correction signals L and R with accumulators A' and B', respectively, are correspondingly greater than the consecutive numbers required with accumulators A and B. Although the actual numbers chosen will depend to a large extent on the particular process to be controlled, I have found that the numbers "10" and "3" are preferable for many applications, as will be explained more fully in connection with Fig. 3. That is to say, 10 consecutive gage signals X and Y supplied to accumulator A', or 3 consecutive gage signals X supplied to accumulator A produces a correction signal L. Likewise, 10 consecutive gage signals Y and Z supplied to accumulator B', or 3 consecutive gage signals Z supplied to accumulator B produces a correction signal R.

Referring now to Fig. 3, there is illustrated with a solid line 30 a normal distribution curve identical with curve 30 of Fig. 2. Dotted line 31 represents an additional normal distribution curve similar to curve 30 but with its median axis 22' displaced with respect to median axis 22 of curve 30. The displacement of axis 22 to a new position 22' may be considered as analogous to an increase in the average size of the articles being manufactured from a desired size $v$ to a different size $v'$ such as might be occasioned by tool wear, for example. In this event, it will be desirable to provide a correction signal R as soon as possible so as to decrease the average size of the articles being manufactured and thereby conform the sizes more nearly to the size $v$ corresponding to axis 22. Assuming $w$ and $u$ represent the tolerance limits above and below which the sizes of the articles are so much different from desired size $v$, that they are unacceptable, it will also be desirable to provide a correction signal R before any scrap articles are produced. To this end, gage limits or lines 21 and 23 are positioned in the neighborhood of the points of inflection of curve 30 or even somewhat farther removed from the tolerance limits $u$ and $w$, as shown.

A comparison of Figs. 2 and 3 with regards to the various ranges of sizes defined by lines 21 and 23 shows that the range $a$ (Fig. 3) corresponds to the range $x$ (Fig. 2), the range $a'$ (Fig. 3) corresponds to the range $x+y$ (Fig. 2), the range $b'$ corresponds to the range $y+z$ (Fig. 2), and the range $b$ (Fig. 3) corresponds to the range $z$ (Fig. 2). It follows, therefore, that letters $a$, $a'$, $b'$, and $b$ are representative of the individual ranges of sizes of articles to which the respective accumulators A, A', B', and B are responsive. For example, a gage signal will be registered in acculator A each time there is produced an article having a size in the range $a$, a gage signal will be registered in accumulator A' each time there is produced an article having a size in the range $a'$, and so forth. With particular reference to the range $b$, and shaded areas 34 and 35 of curves 30 and 31 defined by this range, a graphical demonstration of the probability of accumulator B registering a gage signal appears. Thus, when curve 30 is the distribution curve which accurately represents the variations in size of the articles being produced, the probability of a gage signal being received and registered by accumulator B is that portion of the total area under curve 30 within range $b$, that is, area 34. This probability is hereinafter designated $P_{B1}$. When curve 31 is the distribution curve associated with the process, however, evidencing an increasing in the average size of the articles from $v$ to $v'$, it is the area under curve 31 within range $b$ which determines the probability of a gage signal being registered by accumulator B, this area comprising area 34 augmented by area 35. The probability in this case will be designated $P_{B2}$. Since the sum of areas 34 and 35 is much greater than area 34 alone, it follows that $P_{B2}$ is relatively large as compared with $P_{B1}$, and that $P_{B2}$ raised to the third power is larger still as compared with $P_{B1}$ taken to the third power. This means that the probability of three consecutive gage signals being registered in accumulator B so as to produce a correction signal R is relatively small when the average size of the articles being produced equals $v$, but the probability becomes relatively great when an increase in average size from $v$ to $v'$ occurs. Hence, a reduction in the size of future articles will be assured on the basis of a minimum number of measured articles having an average size greater than $v$ such as size $v'$, for example, whereas a reduction in size will be relatively unlikely when the average size of the articles equals $v$, the desired size.

With particular reference now to range $a'$, it will be observed that this range of sizes is much larger than is range $b$, previously discussed. In fact, range $a'$ includes all sizes other than those within the range $b$ which may be encountered. Accordingly, when curve 30 is representative of the distribution of sizes, the probability of an article having a size in the range $a'$, which may be designated $P_{a1}$, is relatively large as compared with $P_{b1}$ or even for that matter $P_{b2}$. To compensate for this fact, in order to make the probability of a correction signal L being produced by accumulator A' rather small when the average size equals $v$, as is desired, ten consecutive gage signals registered in accumulator A' are required before signal L is produced rather than three as is necessary in accumulator B to produce signal R. With the gage limit represented by line 23 being positioned substantially as shown, $P_{a'1}$ raised to the tenth power, is approximately equal to $P_{b2}$ raised to the third power, indicating that the likelihood of correction signals L and R being produced by accumulators A' and B is equally small in this case. When the average size of the articles being produced appears to decrease, however, accumulator A' will shortly provide a correction signal L owing to the increased probability $P_{A'2}$ of articles having sizes within the range $a'$ for much the same reasons discussed in connection with accumulator B.

Hence, by use of only accumulators B and A' and a single gage limit 23 defining two ranges of sizes $b$ and $a'$, there is provided a means to compensate for persistent deviations in either direction from a desired average size. While I may employ such a two-accumulator system, it may not be as quickly responsive to persistent occurrence of sizes in the $a$ part of the $a'$ range to produce a correction signal before any scrap articles are produced. For this reason, as well as other factors related to the sensitivity and versatility of the system, it has been found preferable to utilize accumulators A and B' for producing correction signals L and R as well as accumulators A' and B.

With reference to gage limit or line 21, it will be observed that the ranges $a$ and $b'$ defined thereby are equal in magnitude to ranges $b$ and $a'$, respectively, but occur in reverse order, that is to say, their location is complementary to that of ranges $b$ and $a'$. It will be apparent, therefore, that accumulator A operates in precisely the same manner as accumulator B except that the former is responsive to decreases in sizes whereas the latter is responsive to increases in sizes. Likewise, accumulators A' and B' differ only with respect to the sense of a deviation from a desired average size to which they respond. Consequently, in applications where it is important only to minimize the number of articles having sizes which are too small, for example, accumulators B and B' and their correction signal R may be eliminated. Another possible modification of the system is to utilize only accumulators A and B to take care of size deviations in both directions, eliminating accumulators A' and B'. In this case, only three consecutive sizes in either of the outsize regions $x$ or $z$ will cause correction. I have found, however, that the occurrence of ten consecutive sizes in the region $y$ plus either $x$ or $z$ is also normally indicative that a correction is desirable. Hence, the system of four accumulators as shown, which will produce correction in such case, is presently preferred. In this system, information relative to the size of every article measured is stored and ultimately may be acted on by the computer.

Referring now to Fig. 4, there is illustrated a circuit of the novel computer of this invention, which is designed to operate in the foregoing manner statistically to analyze article characteristics such as size, for example, and which includes four stepping relays 56, 57, 58 and 59 corresponding to accumulators A, A', B' and B, respectively. Also included in the circuit are control relays 42, 43, 44, and 45 energized by a direct current source (not shown) at a pair of terminals 40 and 40', a negative terminal 40' being connected to a common point or ground, and a positive terminal 40 being coupled into the circuit through a switch 41. Relay 42 has two sets of normally open contacts 52 and 62; relay 43 has two sets of normally open contacts 53 and 73, and also two sets of normally closed contacts 63 and 83; relay 44 has two sets of contacts 54 and 64 normally open and normally closed, respectively; and relay 45 has two sets of contacts 55 and 65 normally open and normally closed, respectively.

Relay 42 is connected to terminals 40 and 40' through switch 41, contacts 63 of relay 43 and a resistor 46. A capacitor 47 is connected in parallel with relay 42 so as to delay the opening and closing of contacts 52 and 62. Relay 43 is connected to terminals 40 and 40' through contacts 52 of relay 42 and a resistor 48, there being a capacitor 49 coupled across relay 43 for time delay in opening and closing. Contacts 53 of relay 43 connect relay 43 directly to terminals 40, 40' through switch 41.

Relays 44 and 45 are selectively connected to terminals 40 and 40' by means of a three-position switch 51, wherein one position is neutral. In particular, relay 44 is coupled across terminals 40, 40' when switch 51 is caused to assume one non-neutral position, whereas, alternatively, relay 45 is coupled across terminals 40, 40' when switch 51 is in the other non-neutral position. Contacts 62 and 83 of relays 42 and 43, respectively, are connected in series between switch 41 and one contact of each pair of contacts 54, 64, 55, and 65. The remaining individual contacts 54, 64, 55, and 65 of relays 44 and 45 are connected in turn to stepping relays 56, 57, 58, and 59. Stepping relays 56, 57, 58, and 59 are provided with stepping terminals 56', 57', 58', and 59', respectively, homing terminals 56'', 57'', 58'', and 59'', and ground terminals which for clarity have not been numbered. When the voltage at terminals 40, 40' is impressed across a particular stepping terminal and ground such as between terminal 56' and ground, for example, the relay associated with that pair of terminals, in the example relay 56, advances one step. When the voltage is impressed between one of the homing terminals and ground, however, as between homing terminal 56'' and ground, relay 56 is caused to assume its neutral or zero position. An example of this type of relay may be found at page 151 of the January, 1954, issue of the periodical publication entitled "Electrical Manufacturing." Specifically, relay 56 has one switch assembly 66 provided with six steps; relay 57 has two switch assemblies 67 and 77, which are ganged, and each of which is provided with ten steps; relay 58 has two switch assemblies 68 nd 78, also ganged, and having ten steps each; and relay 59 has one switch assembly 69 provided with six steps. With regard to the foregoing designated numbers of steps, it will be observed from Fig. 4 that each of the switch assemblies of stepping relays 56, 57, 58, and 59 has a zero or neutral position so that the total number of positions are seven in the cases of assemblies 66 and 69, and eleven in the cases of assemblies 67, 77, 68, and 78 rather than six and ten, the respective numbers of steps. All of the switch positions of assemblies 67, 77, 68, and 78, respectively, except the last are interconnected with one another. Assemblies 66 and 69 have only their respective fourth, fifth, and sixth switch positions interconnected.

The manner in which the individual contacts of sets 54, 64, 55, and 65 are connected to stepping relays 56, 57, 58 and 59, is as follows. Contact 54 is connected to stepping terminal 56' and also to homing terminal 58''. Contact 55 is connected to stepping terminal 59' and to homing terminal 57''. Contact 64 is connected to homing terminal 56'' and through switch assembly 68 to stepping terminal 58'. Contact 65 is connected to homing terminal 59'' and through switch assembly 67 to stepping terminal 57'.

There are also provided in the circuit of Fig. 4 a pair of machine controller actuating solenoids 96 and 99, and a pair of control relays 76 and 79, each of the latter having a set of normally open contacts 86 and 89, respectively. Relay 76 is coupled to one of the contacts 73 through switch assembly 66 at the third, fourth, and fifth positions. Relay 76 is also coupled to this same one of the contacts 73 through switch assembly 77 at the eleventh position. Relay 79 is coupled to the contact 73 through switch assembly 69 at the third, fourth, and fifth positions thereof, and in addition is coupled to contact 73 through switch assembly 78 at the eleventh position thereof provided only that switch assembly 77 has not been stepped a corresponding amount. A ground connection to each of these relays completes their respective energizing circuits. Solenoid 96 is connected to a pair of terminals 60, 60' through contacts 86 and solenoid 99 is connected to the same terminals through contacts 89. Terminals 60 and 60' are in turn connected to a source of power (not shown) for energizing solenoids 96 and 99. Finally, there is provided a control relay 50 connected to contact 73 through the seventh switch position of assembly 66 and also through the seventh switch position of assembly 69. Said control relay 50 may be arranged to shut down an entire machine, as in machine tools, or simply to operate an indicator of machine or process condition.

In operation, switch 41 is adapted to close whenever an article has been produced by machine 13 and is placed in position to be measured by gage 11 of Fig. 1. Upon closing of switch 41, current supplied by the source connected to terminals 40, 40' is permitted to flow through normally closed contacts 63, through resistor 46, and through relay 42. Owing to the fact that capacitor 47 is coupled across relay 42, thereby shunting an appreciable amount of the current from the relay until capacitor 47 becomes charged, the contacts of relay 42, namely 52 and 62, are not immediately actuated. After a short delay, however, when capacitor 47 is charged, a sufficient amount of current flows through relay 42 to actuate contacts 52 and 62.

The reason for this delay is to give switch 51 time to assume a position representative of the size of the article, that is to give the article 12 and the elements of gage 11 time to come to rest sufficiently to provide accurate gaging. More particularly, switch 51 comprises a part of gage 11 of Fig. 1, and is caused to assume one of its three positions in accordance with the size of the article being measured. If the size of the article falls in the range $x$ of Fig. 2, switch 51 assumes its leftward position; if the size of the article falls in the range $y$, switch 51 retains its neutral position; and if the size of the article falls in the range $z$, switch 51 assumes its rightward position. Assuming that the size of the article falls within range $z$, switch 51 will have assumed its rightward position energizing relay 45, and thereby actuating contacts 55 and 65 by the time contacts 52 and 62 of relay 42 close. When these latter contacts do close, as a result of capacitor 47 having become substantially fully charged, current is permitted to flow through contacts 62, through normally closed contacts 83 of relay 43, through contacts 55 and through stepping relay 59 by way of stepping terminal 59'. Accordingly, switch assembly 69 associated with stepping relay 59 is advanced one step. At the same time, switch assemblies 67–77 of stepping relay 57 are caused to assume their zero or home position by virtue of the fact that homing terminal 57'' is coupled to stepping terminal 59' of relay 59. Relay 44 is de-energized and contacts 64 are closed with switch 51 in this position so that current is also permitted to flow through contacts 64 to stepping relays 56 and 58, at homing terminal 56'' and stepping terminal 58', respectively. Hence, switch assemblies 68–78 advance one step and switch assembly 66 homes.

If the size of the article had fallen into range $x$ of Fig. 2, relay 44 would have been energized instead of relay 45 so that current would flow through contacts 54 and through stepping relay 56 by way of stepping terminal 56', advancing switch assembly 66 one step. Also, switch assemblies 68–78 would home, since homing terminal 58'' of stepping relay 58 is connected to stepping terminal 56' of relay 56. Relay 45 would be de-energized and contacts 65 closed, in this position of switch 51, so that current is also permitted to flow through contacts 65 to stepping relays 59 and 57 by way of homing terminal 59" and stepping terminal 57', respectively, advancing switch assembly 77 one step and homing switch assembly 69.

If the size of the article had fallen into range $y$, on the other hand, neither of relays 44 and 45 would be actuated because switch 51 would be in its neutral position. Hence, current would flow through normally closed contacts 64 and 65 of relays 44 and 45, respectively, and through stepping relays 56 and 59 by way of their respective homing terminals 56" and 59". In this case both switch assemblies 66 and 69 of relays 56 and 59 would be caused to home. At the same time, individual circuits would be established across terminals 40 and 40' including switch assembly 67 and stepping terminal 57' of relay 57 on the one hand, and including switch assembly 68 and stepping terminal 58' of relay 58 on the other. Therefore, in addition to the homing of switch assemblies 66 and 69, respectively, switch assemblies 67—77 and 68—78 of relays 57 and 58, respectively, would be caused to advance one step.

The operational significance of switch 51 may be summed up as follows. With switch 51 in its rightward position, indicating a size in the range $z$, switch assemblies 68—78 and 69 advance one step each, whereas switch assemblies 66 and 67—77 home. With switch 51 in its normal position, indicating a size in the range $y$, switch assemblies 67—77 and 68—78 each advance one step, whereas switch assemblies 66 and 69 home. Finally, with switch 51 in its leftward position, indicating a size of article in the range $x$, switch assemblies 66 and 67—77 advance one step each, whereas switch assemblies 68—78 and 69 home. Thus, it is seen that each of the switch assemblies 66, 67—77, 68—78, and 69 either advance a step or home in accordance with the position of switch 51 which represents the size of the article.

After any one of the previously described range determinations has been made, and the switch assemblies have been stepped and homed accordingly, relay 43 actuates contacts 53, 63, 73, and 83. Although relay 43 is energized through contacts 52 and resistor 48, the reason for actuation of the above contacts being delayed until this time is because of capacitor 49. Capacitor 49, until substantially charged, provides a low impedance path in parallel with relay 43 so that initially the current through relay 43 is insufficient to actuate its associated contacts as is the case with capacitor 47 and relay 42. When the contacts are actuated, however, there is provided a well known holding, or stick circuit through contacts 53 so as to maintain relay 43 in an energized condition. In this condition, normally closed contacts 83 become open, interrupting the flow of current to stepping relays 56, 57, 58, and 59, so that the latter are placed in condition to either step or home according to the manner in which they are energized when another article is measured. In addition, contacts 73 close connecting terminal 40 the positive terminal to each movable arm of the switch assemblies 66, 77, 78, and 69. If, for example, by virtue of two other measurements, switch 51 had twice previously assumed its rightward position shown in dotted outline, the movable arm of switch assembly 69 would have advanced three steps, as shown by the dotted arrow, instead of just one, as shown by the solid arrow. In this event, relay 79 would be placed across terminals 40 and 40' by means of switch assembly 69 thereby energizing relay 79, and closing contacts 89. Contacts 89 in turn would energize solenoid 99 which forms a part of machine controller 15 of Fig. 1. Solenoid 99 is adapted to provide a correction in the machine 13 whereby the average size of future manufactured articles is decreased, that is, an R correction. When switch assembly 69 has advanced six steps relay 50 is energized from terminals 40 and 40' rather than relay 79. Relay 50 is adapted to shut down machine 13 owing to the plurality of successive oversize or undersize articles occurring in spite of the corrections provided in machine 13. In other words, relay 50 will normally be energized only when some radical change has occurred in the process requiring the attention of an operator.

Alternative operation which may occur is as follows. If switch assembly 66 has been caused to advance three or more steps because of three or more consecutive measured articles having sizes in the range $x$, relay 76 will be energized through switch assembly 66. Relay 76 then energizes solenoid 96 by means of contacts 86 so as to provide an L correction in the process. That is to say, solenoid 96 when thus energized causes machine 13 to produce future articles of increased average size. After six consecutive steps, however, relay 50 is energized, shutting down the machine for the reason mentioned in connection with switch assembly 69.

It may be observed with reference to Fig. 4 that switch assemblies 77 and 78 also energize relays 76 and 79, respectively, after ten consecutive steps. Hence, a correction of one sense like the correction caused by switch assembly 69 will be provided in machine 13 by switch assembly 78, whereas a correction of the opposite sense like the correction caused by switch assembly 66 will be provided by switch assembly 77. Owing to the fact that switch assembly 78 advances a step when switch 51 is in either the rightward position or the neutral position, it may also be observed with reference to Fig. 2 that switch 78 will advance if the size of the article falls in either of the ranges $y$ or $z$. These two ranges $y$ and $z$ of Fig. 2 are equivalent to range $b'$ of Fig. 3 which is seen to be much larger than range $x$ of Fig. 2 or the identical range $b$ of Fig. 3. Since ten consecutive sizes in range $b'$ are required to energize solenoid 99 whereas only three consecutive sizes in range $b$ are necessary for this purpose, the probabilities of solenoid 99 being energized by switch assemblies 78 and 69 are substantially the same. Like operation of solenoid 96 is had with switch assemblies 66 and 77. Namely, switch assembly 77 advances a step each time switch 51 is in either the leftward or the neutral positions as the result of an article having a size in the ranges $x$ or $y$ of Fig. 2. Ranges $x$ and $y$ of Fig. 2 are equivalent to range $a'$ of Fig. 3 which is seen to be much greater than range $x$ of Fig. 2, range $x$ being equivalent to range $a$ of Fig. 3. Consequently, to make the probabilities of switch assemblies 66 and 77 energizing solenoid 96 substantially equal, ten consecutive steps are required of switch assembly 77, whereas only three consecutive steps are required of switch assembly 66 to energize solenoid 96 and thereby produce a correction. By provision of stepping relays 57 and 58 and their associated switch assemblies 77 and 78 in addition to stepping relays 66 and 69, it follows, therefore, that the apparatus of this invention accumulates information relative to the size of each article measured irrespective of what that size happens to be. If particular sizes recur a sufficient number of times in the manner previously described, a correction in the process is made tending to conform the sizes more nearly to the desired size.

With reference specifically to switch assemblies 77 and 78 and their mode of connection, it will be observed that should ten consecutive signals be registered therein simultaneously, neither solenoid 96 or 99 will be energized. This is particularly desirable for the reason that an equal number of signals in each of these accumulators necessarily indicates that the previously measured articles had sizes in the range $y$ of Fig. 2. Since it is obviously desirable that this state of events continue, switch assemblies 77 and 78 are thereby rendered ineffective to cause a correction in the machine.

After a sufficient time has elapsed for a correction to be made, if necessary, by either solenoid 96 or solenoid 99, relay 42 becomes de-energized. This is because contacts 63 have been opened upon actuation of relay 43, thereby interrupting the flow of current in relay 42. Since capacitor 47 was initially charged, however, the discharge current therefrom is sufficient to maintain relay 43 in an energized condition for the period of time required to actuate solenoid 96 or solenoid 99 in accordance with the above-described operation. When relay 42 finally does become de-energized, contacts 62 open, breaking the connection from terminal 40 to the movable arms of relays 56, 57, 58, and 59 and thereby de-energizing relay 76 and solenoid 96 or relay 79 and solenoid 99, if either of these were energized previously. Also contacts 52 open so that when switch 41 opens indicating that the article has been removed from gage 11, relay 43 will become de-energized also. After this has occurred, the apparatus is conditioned to react anew to the next article measured by gage 11 as reflected in the position of switch 51.

In practice it may be difficult to preassign the control points such that lines 21, 23 are positioned substantially as shown in Fig. 2, however, because the actual dispersion of the process characterized by the narrowness or broadness of the curve 30, may not be known initially. Moreover, there is no assurance that the distribution of the process will be invariant or for that matter that it will follow a normal or expected distribution curve so that the spacing of the lines 21, 23 may need to be varied from time to time. Accordingly, there has been developed auxiliary means adapted to vary the positions of the control points automatically so that a definite relation between the areas under the distribution curve 30 in the ranges $x$, $y$ and $z$ will be maintained. This is accomplished on the basis of the following considerations.

For M number of articles (not necessarily successive) whose sizes fall within ranges $x$ and $z$, on the average there will be N articles whose sizes fall within range $y$. If, for example, in an assumed process it has been found that M should equal approximately $N/2$, then the lines 21, 23 must be so located that the areas under the distribution curve in the ranges $(x+z)$ will be equal to roughly one third of the total area under said curve and the area under the curve in the range $y$ will be equal to roughly two thirds of the total area.

Turning to Fig. 2A, for example, there is shown in addition to curve 30 another distribution curve 30' which is somewhat broader than curve 30. If lines 21, 23 are spaced with respect to curve 30, such that the foregoing relation obtains, it is apparent that the same relation cannot hold with respect to curve 30'. Rather the lines 21, 23 should be moved further apart to new positions 21' and 23' to establish this relation and thereby provide for an optimum mode of control of the process. Alternatively, in Fig. 2B there is shown a distribution curve 30" somewhat narrower than curve 30 requiring that lines 21, 23 be moved closer together to produce the foregoing relation as shown at 21", 23". The auxiliary means to vary the positions of the control points of gage 11 in response to a positive or negative difference $(M-N/2)$ accomplishes these results. If the difference is positive indicating that too many sizes are falling within ranges $x$ and $y$, as would be the case where the process distribution is represented by curve 30' and the control points by lines 21, 23 (Fig. 2A), then the control points are moved farther apart until new positions 21', 23' are reached. If on the other hand, there is a negative difference indicating that too many sizes are falling within range $y$, as would be the case where the process distribution is represented by curve 30" and the control points by lines 21, 23 (Fig. 2B), then the control points are moved closer together until new positions 21", 23" are reached. It should be noted that the use of the difference $(M-N/2)$ rather than the use of these quantities directly makes it unnecessary to accumulate large numbers of measurements before initiating a corrective action with respect to the location of the control points.

Figure 1A:
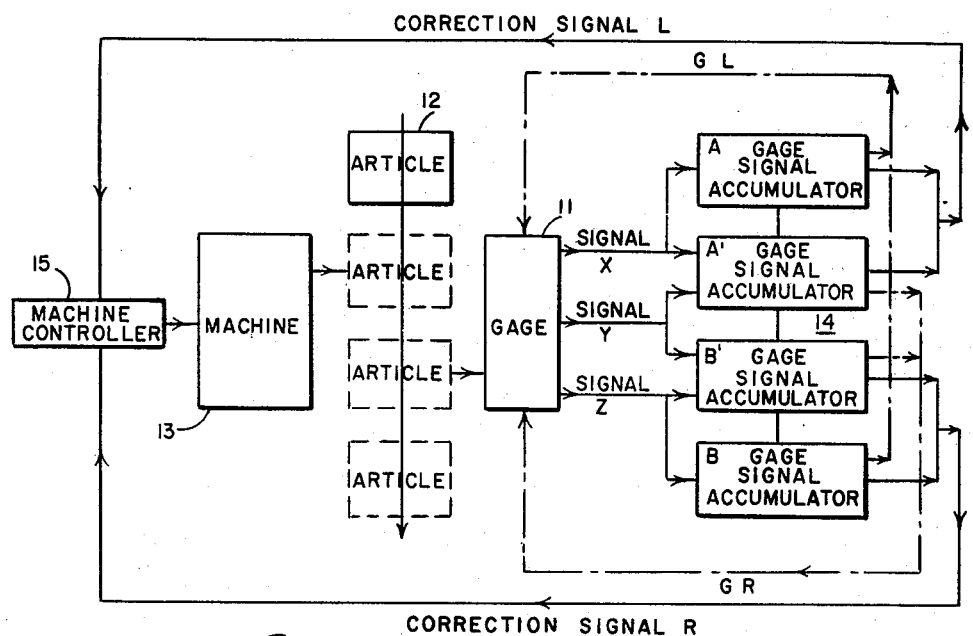
Fig. 1A is a block diagram like that of Fig. 1 with the addition of the auxiliary means to vary the positions of the control points also in accordance with the invention.

Fig. 1A illustrates such operation diagrammatically. Thus, there is derived from gage signal accumulators A and B a gage limit adjusting signal GL, and from accumulators A' and B' another gage limit adjusting signal GR. Each of these signals is fed back to gage 11, as shown, in order to modify the operating characteristics of the gage in such a way that the control points 21 and 23 are moved in the required directions. Specifically, signal GL serves to move the control points or gage limits 21 and 23 away from each other, thereby contracting ranges $x$ and $z$ and at the same time enlarging range $y$. Contrariwise, signal GR serves to bring control points 21 and 23 closer together to produce just the opposite effect. Accordingly, control points 21 and 23 in the here described example will automatically seek locations which so define ranges $x$, $y$, and $z$ that roughly one third of the sizes measured fall in ranges $(x+z)$ whereas roughly two thirds of the sizes fall in range $y$. Hence, M will be equal to $N/2$ and $(M-N/2)=0$. All this will be disclosed more fully in connection with Fig. 4A following.

Fig. 4A is a schematic diagram of apparatus of the same general character as that shown in Fig. 4 with the auxiliary means to vary the positions of the control points incorporated therein. That portion of the circuit which is substantially the same as shown in Fig. 4 is separated from the remainder of the circuit by dotted line 100—100, the portion of the circuit below line 100—100 and toward the right thereof being illustrative of the auxiliary means whereby the positions of the control points are varied. Briefly, such means comprise a gage 11 adapted to provide a voltage output representative of measures of a characteristic such as size, a voltage sensitive transducer 106 responsive to this voltage output and which in effect establishes the positions of the control points represented by lines 21, 23, in Fig. 2, a stepwise variable rheostat 123 to vary the sensitivity of transducer 106, and computing means to control the resistance of rheostat 123 in response to the difference $(M-N/2)$. The computing means includes, in addition to the circuitry of Fig. 4, four relays, having coils 26, 27, 28 and 29, and two sets of normally open contacts each designated 86 and 36, 87 and 37, 88 and 38, and 89 and 39, respectively. Connected to certain of these contacts in a manner to be described in detail hereinafter, are actuating coils 120 and 121 of a stepping relay, designated generally by numeral 101, and having a movable arm 122. Movable arm 122 also serves as the control arm of rheostat 123, which has one of its resistance terminals connected to a common point or ground. Finally, there is provided an active bridge circuit 107 of four arms, made up of a battery 102, a battery 103, an adjustable resistor 104 and the sensing element 105 of gage 11. For convenience the connecting points of the bridge have been designated 1, 2, 3, and 4 respectively. Point 1 is connected to ground and point 3 is connected to the movable arm 122 of stepping relay 101. Points 1 and 3 are also connected across the coil of transducer 106 which takes the form of a polarized relay including a two position switch with a neutral position in addition. The stationary contacts associated with the two non-neutral positions of the switch have been designated as 51' and 51", and the movable contact or arm as 51, corresponding to arm 51 in Fig. 4.

The contacts 86—36, 87—37, 88—38, 89—39 are all on one side connected to terminal 60 of a line supplying a suitable potential. The other sides of contacts 36 and 39 are connected to one leg of coil 121, and the other sides of contacts 37 and 38 are connected to one leg of coil 120, both of said coils having their other legs connected to ground. The other sides of contacts 86 and 87 are connected to one leg of coil 96, and the other sides of contacts 88 and 89 are connected to one leg of coil 99, both of said coils having their other legs connected to ground. The coils 96 and 99 represent solenoids forming a part of controller 15 to initiate the control functions by said controller just as in Fig. 4. Coils 26, 27, 28 and 29 for controlling the aforesaid contacts are energized by virtue of their respective connection between ground and switch assemblies 66, 77, 78 and 69. More particularly, the third, fourth and fifth contact positions of switch assemblies 66 and 69, respectively, are connected to coils 26 and 29, respectively, and the ninth contact position of switch assemblies 77 and 78, respectively, are connected to coils 27 and 28, respectively.

In operation it will be immediately apparent to those skilled in the art that solenoids 96 and 99 operate in substantially the same manner as they do in Fig. 4. The only material difference here is that solenoids 96 and 99 are energized through the contacts of individual relays 26, 27, 28 and 29, one for each of the switching assemblies 66, 67, 78 and 69, in response to fewer consecutive signals, which affords a somewhat more sensitive mode of control. That is to say, each time two consecutive signals have been effectively registered in switching assembly 66, or eight consecutive signals have been effectively registered in switching assembly 77, solenoid 96 is energized through contacts 86 or 87 associated with relay coils 26 and 27. Alternately, when two consecutive signals have been effectively registered in switching assembly 69, or eight signals have been registered consecutively in switching assembly 78, solenoid 99 will be energized through contacts 88 or 89 associated with relay coils 28 and 29. In effect, therefore, the outputs provided by switching assembly 66 and 77 have been combined for actuating solenoid 96, whereas the outputs of switching assemblies 78 and 69 have been combined for actuating solenoid 99. By means of contacts 36, 37, 38 and 39, however, a different combination of these outputs is provided to control the sensitivity of polarized relay 106 by means of the above-mentioned bridge circuit as modified by the setting of rheostat 123.

Thus, contacts 36 and 39 operate to energize coil 121 of stepping relay 101 after two or more consecutive signals have been registered in either of switching assemblies 66 and 69. Contacts 37 and 38, on the other hand, operate to energize coil 120 after eight or more consecutive signals have been registered in one or the other of switching assemblies 77 and 78 provided one of said switching assemblies is lagging the other. In other words, stepping relay 101 will be caused to step once in one direction each time two, three or four consecutive signals corresponding to measures in ranges x and z are registered in accumulator A or B, whereas one step in the opposite direction will be produced each time eight or more consecutive signals corresponding to measures in range y are registered in one of accumulators A' or B' until the other of said accumulators also has accumulated eight signals. By virtue of the stepwise movement of movable arm 122 produced in this manner, the effective resistance of rheostat 123 will be increased or decreased according to whether more measures fall into range y or ranges x and z in combination. As a result, the sensitivity of polarized relay 106 will be increased and decreased correspondingly, since rheostat 123 is connected across said relay.

The relay 106 in turn is energized by means of batteries 102 and 103 which form a part of the bridge circuit including resistor 104 and gage sensing element 105. Although batteries have been illustrated for convenience, any other suitably regulated direct current source is of course equally well adapted for this purpose. When the resistance of element 105 deviates sufficiently from a predetermined value corresponding to the desired characteristic of the product, polarized relay 51 will be actuated closing either contacts 51' or contacts 51" according to the sense of the deviation. In this way, measurement signals x and z are produced. However, the amount of the deviation in the resistance of gage sensing element 105 effective to cause polarized relay 106 to be actuated is modified by the effective resistance value of rheostat 123. Since the resistance of rheostat 123 is in turn controlled by means of switch assemblies 66, 77, 78 and 69, the sensitivity of gage 11 and therefore the location of the control points 21 and 23 will be governed by the output of gage 11; and in particular they will be moved toward or away from each other (Figs. 2A and 2B) according to the relative numbers of measures in ranges x and z on the one hand, and range y on the other hand. For convenience I have chosen to use respective consecutive numbers of measures in range y and ranges x and z in combination, since accumulating devices operative to register consecutive numbers of signals and to energize the controller solenoids 96 and 99 have been disclosed in detail in connection with Fig. 4. It will be apparent to those skilled in the art, however, that the logical operation of the auxiliary means to vary the positions of the control points in no way depends upon the use of consecutive numbers of accumulated signals. Rather all that is necessary is that stepping relay 101 be stepped once in one direction in response to a predetermined number of signals corresponding to measures in ranges x and z, and be stepped once in the opposite direction in response to a different predetermined number of signals corresponding to measures in range y.

It will be understood that the above-described circuits are of general application in the controlling of manufacturing processes in accordance with the present invention, since they may readily be supplied by means of suitable transducing devices with indications of, for example, pressure, temperature, pH and the like in chemical processes, as well as size, as is most common in mechanical processes. Indeed, almost any material or article characteristic having a substantially normal statistical distribution curve may be controlled so long as signals representing measurements of the characteristic are produced. Likewise, the output of the computer, although herein shown in the form of solenoids, may in practice be any equivalent mechanism effective to operate controllers of various types for manufacturing processes to control the output of said processes.

In Figs. 5 through 14 is shown a specific application of the process control apparatus of the invention as embodied in an automatic internal grinding machine, typical examples of such a machine being shown in each of U.S. Patents Nos. 2,429,830, 2,502,862, and 2,671,293. Such a machine in general includes a base 200 having mounted thereon a work head 202 and a wheel head 204, each of such heads being suitably mounted for movement longitudinally as well as transversely of the machine base and relative to one another; and having automatic means for so moving them, all as is well known in the art. The work head 202 supports suitable means arranged to rotate a cylindrical workpiece having a bore to be finished and to maintain the workpiece in an operative position as by a chuck 206 while its bore is ground to a specified diameter. The work head 202 also carries the diamond holder (hereinafter more fully explained) having a sizing diamond 210 mounted thereon.

Suitable means for automatically loading workpieces into chuck 206 and discharging them therefrom may be provided, such means, for example, including a swinging arm 212 for moving workpieces to be finished from a storage magazine 208 into position to be gripped by said chuck, and a transfer chute 214 for carrying away finished workpieces or articles 12 released by said chuck and delivering them to hereinafter described automatic gaging means.

The wheel head 204 has mounted thereon a suitable grinding wheel 216, such grinding wheel being driven by a motor (not shown) in the usual manner for grinding the internal bore in a workpiece held in chuck 206.

In the operation of such a conventional grinding machine, all as described in the above-mentioned patents, a workpiece to be finished is first loaded from magazine 208 into chuck 206 by loading arm 212. The workpiece held in said chuck is then rough ground on its interior surface by relative reciprocatory movement of grinding wheel 216 and work head 202, together with simultaneous relative transverse movement of said work head and said grinding wheel. After rough grinding an amount determined by the preset relative transverse movement of the work head and grinding wheel, the grinding wheel 216 is conventionally trued by truing diamond 210. Following the truing operation, the workpiece is subjected to a finish grind operation by means of further relative reciprocation and traverse of work head 202 and grinding wheel 216 as before. Finally, the finished article 12 is conventionally removed by opening of chuck 206 and ejection of said article 12 into transfer chute 214. A new workpiece to be finished is then automatically positioned in chuck 206 by loading arm 212 to begin a successive machine cycle.

As above noted, the turning diamond 210 is used at some time during the work cycle, for example, just prior to the finish grind portion of said cycle, to true the grinding wheel 216 by removing material from its outer peripheral surface. Thus, in order that the outer surface of grinding wheel 216 will, after each truing operation, be in the same relative transverse position for each successive workpiece to provide bores of a specified diameter, assuming no machine or tool errors, the work head and wheel head are also automatically adjusted relatively to one another for some predetermined distance just prior to such truing.

Suitable means as fully described in the above-mentioned patents are provided for automatically carrying out the entire aforementioned grinding cycle and for beginning a new cycle in a manner whereby finished articles 12 are produced at a high rate of speed so long as magazine 208 is kept supplied with unfinished workpieces. Machine adjustments, principally by adjustments of the truing diamond relative to the axis of the workpiece are, as a practical matter, required from time to time in order to maintain the bore diameter of said articles within a specified tolerance.

According to the prevent invention, the above-described internal grinding machine is provided with means for controlling the bore diameter of future finished articles 12 in accordance with the foregoing statistical principles. Such means include automatic gaging means for automatically gaging finished articles ejected from said machine, and for providing output signals to the hereinbefore described computer (Fig. 4) and machine controller means actuated by said computer for controlling the bore diameter of articles 12 produced by the machine and for shutting down the machine when the occasion requires by actuating a power controller through relay 50.

The novel automatic gaging means of the invention, as best shown in Figs. 8 through 11, includes a housing 220 mounted on machine base 200 adjacent the end of transfer chute 214, such housing having at its forward portion a passageway with an article gaging station therein for receiving articles 12 delivered from transfer chute 214; for maintaining them clamped in a fixed position during a gaging operation, and finally for releasing them to an exit chute 218. Said passageway is formed by a bottom wall 222 and front and rear side wall members 224 and 226, respectively, and extends entirely through the forward portion of the housing 220 for passage of a cylindrical article 12 therethrough, said bottom wall preferably being slanted downwardly somewhat from chute 214 (Fig. 6) so that an article will roll through said passageway as hereinafter described. The rear side wall member 226, as also hereinafter more fully described, is mounted for reciprocating movement toward the fixed front side wall member 224 to clamp an article 12 therebetween, and is provided with a suitable bore 227 of a diameter equal to the desired bore diameter of the article 12, thus providing a standard bore for gage comparison.

Extending through a substantially vertical bore in housing 220 from the bottom wall 222 of said passageway is mounted a plunger 228 for substantially vertical movement relative to said bottom wall, said plunger being an extension of the piston of an air cylinder 234 mounted on said housing beneath said bore. The plunger is normally maintained with its upper surface flush with the bottom wall of the passageway by means of a spring 230 positioned between housing 220 and a flange 232 on said plunger, as long as fluid under pressure is not present in said cylinder 234. Said cylinder is arranged for introduction of fluid under pressure to move said plunger upwardly against the force of spring 230. The cylinder 234 is actuated by the presence of an article 12 over the upper face of plunger 228 by means of a time delay switch 236 having its actuating element 238 extending upwardly through a bore in the bottom wall 222 of said passageway just in advance of the position of said plunger 228. Switch 236 is of a type wherein the contacts are normally open. When switch 236 is actuated, the contacts close after a short time delay and then open after a second, longer time delay, so as to then assume their normal condition.

In the upper portion of the passageway between side wall members 224 and 226 is mounted a clamp fixture 240 having a pair of clamping surfaces which form an inverted V-shape for maintaining an article 12 aligned in elevated fixed position for a gaging operation. Clamp fixture 240 is also provided with a generally vertical plunger 242 extending through a bore therein to the junction of said V surfaces, said plunger extending downwardly sufficiently far to be engaged by an article 12 being positioned in said clamp fixture to move said plunger upwardly. The plunger in its upward position moves from its normal position a generally horizontal lever 244 pivoted at one end on said clamp fixture. The lever 244 has mounted on its other end a release plunger 246 extending generally vertically through the clamp fixture into the article passageway near the exit end thereof. Such release plunger, in its upward position (Fig. 8) is clear of said passageway and in its normal downward position (shown dotted in Fig. 8) prevents the exit of an article from the passageway to exit chute 218. A normally open single pole single throw switch 250 is mounted on said housing 220 with its actuating plunger 252 in contact wtih lever 244 so that upward swinging movement of said lever about its pivot caused by the positioning in fixture 240 of an article 12 will actuate said switch to initiate the gaging operation.

In order to measure the bore of a workpiece positioned against clamp fixture 240, a gage mechanism having a sensing element 260 mounted at one end of a hollow gage stem 262 is provided as shown in Figs. 10 and 11, said sensing element being arranged to be moved into gaging position within the bore of article 12 from a normal retracted non-gaging position. To accomplish such result, the gage stem 262 extending axially of said article 12 is mounted for reciprocatory movement within a surrounding inner cylindrical element 264 by means of suitable ball bearings 266. Said element has mounted on its forward face the movable wall member 226 within the bore 227 of which gage element 260 may be maintained in retracted, non-gaging position. In order to reciprocate gage stem 262 relative to element 264, said gage stem is provided with a flange 268 which forms the piston of a hydraulic mechanism, said piston being mounted within an outer cylindrical element 270. The outer cylindrical element 270 surrounds the inner cylindrical element 264, said latter element being adapted for reciprocatory movement therein by means of bearings 272 to clamp an article 12 between the fixed forward wall member 224 and the movable wall member 226. The outer cylindrical element 270, together with its rear wall 274, forms a chamber 275 within which piston 268 may be moved by admission of fluid under pressure through inlet 276 to move piston 268 with gage element 260 into gaging position, as well as to move the inner cylindrical element 264 forward until stopped by article 12. Spring 278 is interposed between said piston and the rear wall of element 264 to permit overtravel of said piston. The gage stem 262 extends rearwardly through rear wall 274 of element 270 and has mounted thereon in axially adjustable position, as by nuts 280 and 282, an arm 284 adapted to actuate forward and rear switches 288 and 286 respectively mounted on housing 220. The actuating element 284 of forward switch 288 actuates both computer switch 41 and said gage control switch 288, but rear switch 286 comprises a single switch as shown in Fig. 9. A spring 290 is provided between rear wall 274 of element 270 and nut 282 normally to urge gage stem 262 rearwardly out of gaging position within the bore of an article 12 to a non-gaging position within bore 227 of wall 226 and also to move wall member 226 rearwardly to release said article.

The electrical hydraulic operating circuit of the above-described automatic gage mechanism is best shown in Fig. 11 and includes switches 236, 250, 286, and 288, as well as solenoid operated hydraulic valves 298 and 299 for supplying fluid under pressure to chamber 275 and cylinder 234, respectively. Thus, normally open switch 250, normally closed time delay switch 288, and normally open time delay switch 286 (mechanically closed by arm 284) are all connected in series with the actuating coil of valve 298 across terminals 251, to which terminals a suitable source of electrical power may be provided. Normally open time delay switch 236 is also connected across said terminals in series with the coil of solenoid valve 299, both of said solenoid valves being connected to a suitable source of fluid pressure in their energized position and being connected to exhaust in their normal position.

The gage mechanism provided is preferably of the fluid gage type as shown diagrammatically in said Fig. 11, in which the sensing element 260 is provided with radial passageways 261 communicating with an axial bore 263 in gage stem 262. Said sensing element is of such external diameter with respect to the desired bore of an article 12 that when it is positioned within said bore and gaging fluid is passed into gage stem bore 263, the discharge of said fluid from radial passageways 261 therein will be at a rate determined by the spacing between the orifices of said passageways and said article. Thus, the resistance to flow provided by the presence of the surface of an article spaced a slight distance from said orifice may be used to provide an indication of hole size, by the measurement of fluid flow or pressure. For example, the bore 263 may be connected as by a flexible tube 265 extending from the outer end of gage stem 262 to a suitable transducer for measuring fluid pressure or flow and for producing an electrical output signal therefrom which may be used as an indication of article bore diameter.

A practical transducer may include a hollow tube 291 connected at its one end to flexible tube 265 and at its other end to a suitable source of fluid at regulated pressure (not shown). Said tube has adjacent its latter end a restriction 292 forming a resistance to fluid flow and is in communication on the sensing element side of said restriction with a chamber formed by a cup-shaped member 293. The chamber has its open side closed by a flexible diaphragm 294, which diaphragm may be provided with means for sensing a plurality of positions thereof to provide indications corresponding to different article bore diameters. Thus as shown, a lever 295 is pivotally mounted on said cup-shaped element and has its one end in contact with said diaphragm so that it will be moved thereby. The other end of said lever is arranged to selectively contact one of a pair of adjustable insulated switch elements 296 and 297 mounted on said cup-shaped member 293, said switch elements, together with said lever, forming a single-pole double-throw switch 51 suitable for providing to the hereinbefore described computer 14 of Fig. 4 electrical indications of three selected ranges of positions of said diaphragm corresponding to three predetermined ranges of article bore diameters. Those skilled in the art will recognize that the gage mechanism is also readily adaptable for use in the modified embodiment of Fig. 4A. For example, a conventional strain gage (not shown) may be mounted on the diaphragm, the resistance wire of the gage corresponding to the variable resistance element 105 of Fig. 4A.

In the operation of the gage, fluid from the regulated source will undergo a pressure drop between said restriction 292 and the restriction caused by the presence of a workpiece or article 12 surrounding the gage sensing element 260. Such pressure drop is sensed by lever 295 through the deflection of diaphragm 294. At some predetermined maximum and minimum article bore diameters, which diameters may be selected by adjustment of switch elements 296 and 297, lever 295 will contact one of said switch elements to provide one of three signals to computer 14 indicating that the article bore diameter is either under the selected minimum, over the selected maximum, or between such values. Other types of gages providing such signals suitable for transmission to computer 14 may also be used, the computer providing as an output either of two corrective signal pulses of, for example, right or left polarity. The computer 14 may conveniently be mounted on machine base 200 adjacent said gage housing 220 for ready connection to switches 41 and 51 which form a part of the computer circuit (Fig. 4) and to master power switch 50.

In the operation of the novel automatic gaging means of the invention, assume that the gage be in operation and continuously gaging successive articles 12 being received from transfer chute 214. At the beginning of a gaging cycle with plunger 228 in its downward position and an article retained in the passageway by plunger 246, an article to be gaged can roll from chute 214 into the gage passageway. This actuates time delay switch 236 through its plunger 238 as the article rolls over the face of elevating plunger 228 into contact with a previous article (shown dotted in Fig. 8) maintained in the passageway by plunger 246. After a short time delay the contacts of actuating switch 236 close, moving solenoid actuated hydraulic valve 293 to its energized position and operating cylinder 234 which, through its actuating plunger 228, moves workpiece 12 upwardly into position against clamp fixture 240. Such upward movement in turn moves upper plunger 242 upwardly, swinging lever 244 about its pivot axis 243 to move release plunger 246 upwardly to release the previous article retained thereby, as well as to move actuating element 252 of switch 250. The closing of switch 250 by movement of the article 12 into gaging position closes a circuit through normally closed time delay forward switch 288 and normally open time delay rear switch 286 (such rear switch being then closed by gage stem arm 284) to energize solenoid valve 298 and admit fluid to chamber 275 to move the gage stem 262 forward to carry the gage sensing element 260 into gaging position within the article 12. The forward movement of gage stem 262 also results in the forward movement of inner cylindrical element 264 so that the rear wall member 226 mounted on the forward face thereof will move forward to clamp the article 12 against the forward fixed wall member 224, the spring 278 permitting free forward movement of the gage sensing element even though inner cylindrical element 264 be stopped by contact of article 12 with said forward wall member.

When the sensing element 260 reaches its gaging position within the bore of article 12, computer circuit actuating switch 41 and forward limit switch 288 are both actuated by their common actuating element 284, the latter switch then opening after a sufficient time delay for the gage measuring element to be operated to provide a gaging signal to computer 14. The opening of switch 288 de-energizes solenoid valve 298 permitting gage stem 262 to be moved rearwardly by spring 290 so that the sensing element is moved into its retracted non-gaging position within the bore 227 of wall member 226, said wall simultaneously moving rearwardly to release article 12 from its clamped position against forward wall 224. Immediately thereafter, solenoid 299, is de-energized by the opening of time delay switch 236 so that spring 230 will move plunger 228 downwardly and release article 12 from its clamped position against clamp 240. The article will then roll along said passageway until stopped by release plunger 246, which plunger has been moved into its downward position by the downward movement of plunger 242.

Upon actuation of computer switch 41 by the positioning of gage sensing element 260 within article 12, the hereinbefore described computer circuit becomes operative so that one of three signals provided by the above-described gage measuring element can be provided thereto. Thus, the flow of fluid takes place through gage measuring element 291 and outwardly through the orifices at the end of passages 261 in gage sensing element 260. Under these conditions, a pressure drop will occur in the moving fluid column between the restriction 292 therein and the restriction caused by the presence of a workpiece surrounding sensing element 260, said pressure drop being sensed by flexible diaphragm 294 to position lever 295. If the article 12 be of exactly the proper diameter, the lever 295 will be positioned midway between its contacts 296 and 297 and will provide signal Y to the computer 14. If the article 12 be beyond either of the set gage limits, the lever will contact either one or the other of contacts 296 and 297 to provide signals X and Z, all of such signals being fed to the computer 14 for analysis as hereinbefore described.

As hereinbefore pointed out, the position of the truing diamond 210 in a properly aligned internal grinding machine may be used to control the bore diameter of a workpiece by its truing of the grinding wheel 216, such diamond conventionally being mounted on the work slide 202 and having means for adjusting its traverse position as well as having means for swinging it to and from truing position at the proper time in the machine cycle, all as is well known in the art.

According to the present invention, however, novel means are provided for automatically positioning the truing diamond 210 in accordance with the corrective signals received from computer 14, such signals, as hereinabove explained, being in the form of pulses of L or R polarity to so position the diamond 210 to produce either an increased or a decreased bore diameter in future workpieces.

For simplicity in the drawings, and more particularly Figs. 12–14, the truing diamond 210 is shown as mounted in a holder 300, said holder in turn being pivotally mounted on a supporting block 302 for pivotal movement about an axis 301 at the proper time in the machine cycle to and from truing position by any suitable means known to the art. The diamond holder supporting block 302 is mounted for substantially rectilinear movement by means of a pair of flexible metal reeds 304, said reeds having one of their ends attached to opposite sides of said block 302 and the other end attached to opposite ends of a fixed supporting block 306 mounted on work head 202. Thus, the truing diamond 210 is supported for transverse movement substantially along a horizontal line perpendicular to the axes of the grinding wheel 216 and article 12.

In order to move the truing diamond 210 back and forth along said line, I have provided a solenoid actuated differential screw means mounted on fixed supporting block 306. Such differential screw means includes a differential screw block 308 having in its one face adjacent diamond holder supporting block 302 a bore 310. Said bore has mounted therein for sliding movement generally parallel to the direction of movement of said diamond 210, the inner screw member 312 of a differential screw mechanism. The inner screw member 312 has within said bore 310 a smooth cylindrical portion having a keyway 314 extending therealong, the block 308 at said bore being provided with a pin 316 engaging said keyway to prevent rotation of said inner screw member while permitting axial sliding movement thereof relative to said block 308.

The inner differential screw member has at its other end remote from said bore 310 a screw threaded portion mounted within an enlarged screw threaded bore 318 in element 308 axially aligned and concentric with said bore 310. An outer differential screw member 320 surrounds the threaded portion of said inner differential screw member 312 and engages both its screw threaded portion and the inner screw threaded bore 318 of block 308, said outer differential screw member having a free end extending outwardly beyond bore 318. The free end of outer differential screw member 320 is provided with a pair of ratchet wheels having oppositely facing teeth, said ratchet wheels being herein designated as right-hand wheel 322 and left-hand wheel 324. Said ratchet wheels are mounted in a hub 325 restrained against axial movement by differential screw block 308, said ratchet wheel supporting hub 325 having a bore through which extends outer differential screw member 320. Said screw member is provided with a key cooperating with a keyway on said hub to permit rotative and sliding movement of said outer differential screw member within said hub. Thus, said ratchet wheels are effective when rotated to turn outer differential screw member 320 and slide inner differential screw member 312 to move diamond 210 to either the right or left to provide either an R or L correction.

In order to rotate said ratchet wheels 322 and 324, solenoid actuated pawl mechanisms are provided on member 308. Such pawl mechanisms each include a pawl member having thereon a pawl tooth, said pawl members each being pivoted on said hub 325 for swinging movement to engage the pawl tooth thereon with a ratchet tooth and rotate outer differential screw 320. Thus, the left-hand pawl member 326 is pivotally connected to an arm 327 by a pin 329, and has a pawl tooth 328 mounted thereon at a spaced distance from its point of pivotal movement. Arm 327, in turn, is pivotally mounted on hub 325, and carries a pin 331 which projects through an elongated hole 333 in the member 326. The armature 330 of left-hand solenoid 96 is connected to pawl member 326 by a link 332, so that upward movement of said armature will swing pawl member 326 about pin 329 to engage pawl tooth 328 with a tooth of ratchet wheel 324 and rock the arm 327 to rotate the ratchet wheel 324. Since the amount of lost motion which occurs before the pawl becomes engaged with the ratchet wheel depends upon the initial position of the arm 327, a stop screw 335 adapted to limit the return movement of the arm, as shown, provides a convenient means for adjusting the amount of angular displacement which the ratchet wheel is caused to undergo. When the solenoid 96 is energized, therefore, ratchet wheel 324 will rotate outer differential screw 320 to move diamond 210 for a predetermined distance in a direction herein designated as left to correct the size of future successive finished articles by increasing their bore diameter.

The right-hand pawl mechanism is similarly constructed to be operated by right-hand solenoid 99 to rotate outer differential screw 320 in the opposite direction and so move diamond 210 for a predetermined distance in the opposite direction herein designated as right to decrease the size of future successive articles.

Thus, in operation of the novel internal grinder of the invention, as successive finished articles 12 are produced thereby, they are automatically gaged to provide signals to the computer, which signals are then analyzed and either left-hand or right-hand correction signals provided as needed to control the size of future articles produced by the machine. More specifically, assume that the internal grinding machine is properly set up and aligned, magazine 208 contains a supply of workpieces to be finished, and all the stepping relays 56, 57, 58, and 59 of computer 14 are cleared. The grinding machine is first started to energize the various grinding machine motors and controls, all as described in Patents Nos. 2,429,830, 2,502,862, and 2,671,293, as well as energizing the computer 14 and the automatic gaging means of the invention. Loading arm 212 begins the machine cycle by moving a first workpiece from storage magazine 208 and placing it in chuck 206. The machine then operates in accordance with its pre-set condition to grind the bore of said workpiece and thereafter eject the workpiece into transfer chute 214, the workpiece passing into the automatic gage of the invention and being retained by release plunger 246.

In the automatic gage as above described, although the cylinder 234 will be actuated to move plunger 228 upwardly, the diameter of the first article delivered to the gage will not be measured since no preceding article is as yet positioned as shown in broken lines in Fig. 8 to prevent the first article from rolling past the plunger 228 into this broken line position. By the same token, however, the first article will not be released when the plunger 228 is moved upwardly because in the absence of an article 12 in position over the plunger 228, plunger 242 will not be actuated and hence will not be effective to raise the plunger 246 out of the way of the first article. The second article 12 produced by the grinding machine will be ejected as before into transfer chute 214 but will be retained in position over elevating plunger 228 by the presence of the first article already retained in the passageway by release plunger 246. Thus, the second article will be raised into gaging position and will be gaged automatically by sensing element 260 to provide one of three output signals X, Y, and Z, as hereinbefore described. The raising of gage elevating plunger 228 resulting in the upward movement of release plunger 246 will permit the first article to roll out of the passageway into exit chute 218 so that the second article when lowered by plunger 228, after its gaging operation, will itself be maintained in position by release plunger 246. Succeeding articles produced by the grinding machine will be automatically gaged and released as was the second article to provide automatic successive gaging of finished articles as they are produced by the machine.

The computer 14, as above described, analyzes the gage signals provided by the automatic gage mechanism, and, if necessary, provides one of two correcting signals to the machine controller to move truing diamond 210 either to the right or left to correct the size of future successive articles produced by the machine to better conform their bores to the selected bore diameter.

Thus it will be seen that I have provided a novel means for controlling a characteristic of a product to maintain it within a prescribed range of measure of the characteristic, as well as providing a novel computer for statistically analyzing the sequence of indications. In addition, I have also provided a novel automatic gage for providing suitable signals to the computer. It will be appreciated by those skilled in the art that various modifications may be made within the spirit of the invention and the scope of the appended claims.

I claim:

1. Apparatus for maintaining a characteristic of a product within a prescribed range of a measure of the characteristic, said apparatus comprising: means to measure the characteristic periodically; means to provide first, second, and third measurement signals indicating that the characteristic is within first, second, and third ranges, respectively, of the measure; means to produce a first control signal in response to the occurrence in a given sequence of a predetermined number of first measurement signals; means to produce said first control signal in response to the occurrence in a given sequence of a predetermined number of said first and second measurement signals in combination; means to produce a second control signal in response to the occurrence in a given sequence of a predetermined number of third measurement signals; means to produce said second control signal in response to the occurrence in a given sequence of a predetermined number of said second and third measurement signals in combination; and means to change the characteristic of the product selectively in response to said control signals, said first control signal causing a change in the characteristic of one sense and said second control signal causing a change in the characteristic of the opposite sense.

2. Apparatus according to claim 1 wherein the magnitudes of said first and third ranges are equal to each other and substantially less than the magnitude of said second range, the measurements represented by the limits of said second range differing from the measurement conforming to the desired characteristic by equal amounts in opposite directions.

3. Apparatus according to claim 1 wherein said first, second, and third measurement signals comprise first, second, and third electrical impulses, respectively; and wherein said means to produce the control signals includes first, second, third, and fourth memory devices, said first memory device being adapted to register first impulses and to clear in response to either of said second and third impulses, said second memory device being adapted to register either of said first and second impulses and to clear in response to said third impulse, said third memory device being adapted to register either of said second and third impulses and to clear in response to said first impulse, and said fourth memory device being adapted to register third impulses and to clear in response to either of said first and second impulses.

4. Apparatus for controlling a characteristic of a product, said apparatus comprising: a measuring device for measuring the characteristic periodically, said measuring device being capable of distinguishing among products having characteristics within first, second, and third ranges, respectively, of the measure of the characteristic; a three position switch actuated by said measuring device, the position of said switch being determined by the range of the measure within which the characteristic falls; means to produce, first, second, and third electrical impulses in accordance with the position of said switch; first, second, third, and fourth stepping relays, each having a stepping circuit, a homing circuit, and a stepping switch, said stepping switch advancing one step upon energization of said stepping circuit, and said stepping switch being cleared upon energization of said homing circuit, said first impulse being impressed on the first stepping circuit and on the third and fourth homing circuits, said second impulse being impressed on said second and third stepping circuits and on said first and fourth homing circuits, said third impulse being impressed on said third and fourth stepping circuits, and on said first and second homing circuit; means controlled by said first and second stepping switches to produce a first control signal upon the occurrence of predetermined numbers of steps thereof; means controlled by said third and fourth stepping switches to produce a second control signal upon the occurrence of predetermined numbers of steps thereof; and means to alter the characteristic of the product selectively in response to said control signals, said first control signal causing a change in the characteristic of one sense, and said second control signal causing a change in the characteristic of the opposite sense.

5. A statistical control system comprising: means for producing an output having a characteristic falling within a range of measure; means for controlling the characteristic of said output; measuring means for sensing said characteristic of said output and providing output signals indicative of the occurrences of characteristics of said output falling within at least two portions of said range of measure, and computer means to determine the respective numbers of said output signals having occurred and their orders of occurrence and providing a correcting signal to said controlling means in response to the occurrences in given sequences of predetermined numbers of said measuring means signals to control said characteristic.

6. A grinding machine statistical control system comprising: a grinding machine for producing in succession articles having a diameter falling within a range of measure including a selected measure, said grinding machine including a workpiece holder, a grinding wheel, means for relatively moving said grinding wheel and holder to grind a workpiece, a truing device for said grinding wheel, and means for relatively moving said truing device and said grinding wheel to alter the diameter of said grinding wheel and thereby control said diameter of said articles, gaging means for measuring said diameter of successive articles produced by said machine and providing output signals indicative of diameters falling within at least two portions of said range of measure, and computer means for analyzing the sequence of gaging means output signals falling within said portions of said range of measure and providing a correcting signal to said grinding machine to relatively move said truing device and grinding wheel upon occurrence of a predetermined sequence of said gaging means output signals to better conform to said selected measure said diameter of successive articles produced by said machine.

7. A grinding machine statistical control system comprising: a grinding machine for producing in succession articles having a diameter falling within a range of measure including a selected measure, said grinding machine including a workpiece holder, a grinding wheel, means for relatively moving said grinding wheel and holder to grind a workpiece, a truing device for said grinding wheel, and means for relatively moving said truing device and said grinding wheel to alter the diameter of said grinding wheel and thereby control said diameter of said articles, gaging means for measuring said diameter of successive articles produced by said machine and providing output signals indicative of diameters falling within each of three portions of said range of measure, said three portions including a central portion and two side portions which together include substantially said entire range of measure, and computer means for analyzing the sequence of gaging means output signals falling within said portions of said range of measure and providing correcting signals to said grinding machine to relatively move said truing device and grinding wheel upon occurrence of a predetermined sequence of said gaging means output signals to better conform to said selected measure said diameter of successive articles produced by said machine.

8. An automatic grinding machine statistical control system comprising: an automatic grinding machine for producing in succession articles having a diameter falling within a range of measure including a selected measure, said grinding machine including a storage magazine for storing workpieces to be ground, a workpiece holder, swinging arm means for moving workpieces from said magazine to said holder, a grinding wheel, means for relatively moving said grinding wheel and holder to grind a workpiece, a truing device for said grinding wheel, and means for relatively moving said truing device and said workpiece holder to control said diameter of said articles, article actuated gaging means for measuring said diameter of successive articles produced by said machine within said range of measure and providing output signals in accordance with diameters falling within each of three portions of said range of measure, said three portions including a central portion and two side portions which together include substantially said entire range of measure, means for moving finished articles from said workpiece holder to said gaging means, and computer means for analyzing the sequence of gaging means output signals indicative of diameters falling within said portions of said range of measure and providing correcting signals to said grinding machine to relatively move said truing device and workpiece holder upon occurrence of a predetermined sequence of said gaging means output signals to better conform to said selected measure said diameter of successive articles produced by said machine.

9. An automatic grinding machine statistical control system as claimed in claim 8 wherein said article actuated gaging means comprises means successively maintaining workpieces in gaging position, a sensing element mounted for reciprocatory movement between a normal non-gaging position and a gaging position, and control means actuated by the presence of a workpiece in gaging position for reciprocating said sensing element from non-gaging position to gaging position for gaging a diameter of said workpiece.

10. A grinding machine statistical control system comprising: a grinding machine for producing in succession articles having a diameter falling within a range of measure including a selected measure, said grinding machine including a workpiece holder, a grinding wheel, means for relatively moving said grinding wheel and holder to grind a workpiece, and truing means for said grinding wheel, said truing means including a truing diamond mounted on a movable support member for transverse movement relative to said workpiece holder, rotatable screw means for transversely moving said movable support member, and electrically actuated means for rotating said screw means for relatively moving said truing diamond and said workpiece holder to control said diameter of said articles, gaging means for measuring said diameter of successive articles produced by said machine and providing output signals indicative of diameters falling within at least two portions of said range of measure, computer means for analyzing the sequence of gaging means output signals falling within said portions of said range of measure and providing a correcting signal to said grinding machine for rotating said screw means to relatively move said truing device and workpiece holder upon occurrence of a predetermined sequence of said gaging means output signals to better conform to said selected measure said diameter of successive articles produced by said machine.

11. A grinding machine statistical control system as claimed in claim 10, wherein said movable support member is provided with a pair of spaced parallel reeds having their one end mounted on said movable support member and their other end mounted in fixed position relative to said workpiece holder.

12. A grinding machine statistical control system as claimed in claim 10 wherein said electrically actuated means for rotating said screw means includes ratchet wheel means mounted on said screw means, pawl means cooperating with said ratchet wheel means, and electric solenoid means for actuating said pawl means to rotate said ratchet wheel means with said screw means.

13. A grinding machine statistical control system as claimed in claim 12, wherein said ratchet wheel means includes a pair of ratchet wheels having oppositely facing teeth, said pawl means includes a pawl cooperating with each of said ratchet wheels, and said solenoid means includes solenoids for actuating said pawls to selectively rotate said screw means in opposite directions.

14. Process control apparatus comprising means for measuring a characteristic of the output of a process to determine in which of at least two different ranges each measurement occurs; process control means for producing changes in the process affecting said characteristic; actuator means for said control means responsive to the occurrences in given sequences of predetermined numbers of said measurements in said ranges to operate said control means to produce such changes and means responsive to measurements in different ranges to vary the limits of said first-named ranges.

15. Process control apparatus comprising means to measure a characteristic of the product produced in the process and to provide different signals representative of measurements in different ranges, means to accumulate the signals separately according to the ranges of the measure which they represent, means to cause a change in the process affecting the characteristic in response to a predetermined number of accumulated signals corresponding to measures in at least one of the ranges, and means selectively responsive to respective predetermined numbers of accumulated signals representing measurements in at least two ranges for expanding and contracting said one of the ranges.

16. Process control apparatus comprising a measuring device for measuring a characteristic of the product produced in the process, said measuring device having upper and lower control points so as to be capable of discriminating between measures falling within upper and lower extreme ranges defined by the control points; means to produce signals representing measures of the characteristic within said ranges; a memory device to accumulate the signals separately according to the range which they represent, means to cause a change in the process affecting the characteristic whenever respective predetermined consecutive numbers of the signals have been accumulated; and means to separate and to bring together said control points to expand and contract said extreme ranges in response to measurements in different ranges.

17. Process control apparatus according to claim 16 wherein said last-named means is adapted to contract said extreme ranges whenever a predetermined number of measures fall within one of said extreme ranges, and to expand said ranges whenever a predetermined number of measures fall outside of the other of said extreme ranges.

18. Process control apparatus according to claim 16 wherein said last-named means is adapted to contract said extreme ranges whenever a predetermined number of measures fall within said extreme ranges in combination, and to expand said ranges whenever a predetermined number of measures fall outside said extreme ranges in combination.

19. Process control apparatus according to claim 16 wherein said measuring device includes a first impedance element whose impedance changes in response to changes in the characteristic; and a transducer actuable whenever the impedance of said element differs from a selected impedance by more than a preselected amount.

20. Process control apparatus according to claim 19 wherein said transducer comprises a polarized relay having a coil and at least two sets of contacts.

21. Process control apparatus according to claim 20 wherein said last-named means includes a second impedance element connected across the coil of said relay, the impedance of said element being variable stepwise in response to electrical impulses.

22. Process control apparatus comprising a measuring device to measure from time to time a characteristic of the product produced in the process, said measuring device including an impedance element whose impedance varies with changes in the characteristic, means to provide first, second and third measurement signals whenever the impedance of said element is within first, second and third ranges, respectively, said first range being centered about a selected impedance and said second and third range lying adjacent said first range; means to accumulate the signals separately according to the ranges which they represent, means to cause a change in the process affecting the characteristic in one way whenever a predetermined number of signals corresponding to measures in said second range have been accumulated consecutively, and to cause a change in the process affecting the characteristic in the opposite way whenever a predetermined number of signals corresponding to measures in said third range have been accumulated consecutively; and means to decrease the extent of said second and third ranges whenever a predetermined number of signals corresponding to measures therein have been accumulated and to increase the extent of said second and third ranges whenever a predetermined number of signals corresponding to measures outside thereof have been accumulated.

23. Process control apparatus comprising a measuring device to measure from time to time a characteristic of the product produced in the process, said measuring device including an impedance element whose impedance varies with changes in the characteristic; a polarized relay including a coil and a magnetically operated switch capable of assuming at least three different positions, a first of said positions being assumed by said switch when said coil is deenergized; circuit means coupled between said coil and said impedance element to energize said relay to cause said switch to assume second and third positions whenever the impedance of said element differs from a selected impedance by more than a preselected amount, said second and third positions being assumed selectively according to the sense of the difference; means to produce first, second and third measurement signals corresponding to said first, second and third switch positions, respectively, and to said first, second and third ranges of the measure therefore which the signals represent; means to cause a change in the process affecting the characteristic in one way whenever a predetermined number of signals corresponding to measures in said second range have been accumulated consecutively, and to cause to change in the process affecting the characteristic in the opposite way whenever a predetermined number of signals corresponding to measures in said third range have been accumulated consecutively; and means to decrease the sensitivity of said relay to decrease said second and third ranges whenever a predetermined number of signals corresponding to measures therein have been accumulated; and to increase the sensitivity of said relay to increase said second and third ranges whenever a predetermined number of signals corresponding to measures outside thereof have been accumulated.

24. Process control apparatus according to claim 23 wherein said circuit means includes an active bridge network, and said impedance element comprises one arm of the bridge.

25. Process control apparatus according to claim 23 wherein said last-named means includes a rheostat coupled across said coil, the resistance of said rheostat being variable in stepwise fashion in response to predetermined numbers of measurement signals.

26. Process control apparatus according to claim 25 wherein said last-named means includes a differential stepping relay for actuating the movable arm of said rheostat.

27. A system according to claim 5 wherein said computer means includes a first memory device adapted to register the signals indicative of the occurrence of characteristics of said output falling within a first one of said portions of said range of measure, and to clear in response to the signals indicative of the occurrences of characteristics falling within the second one of said portions; and a second memory device adapted to register the signals indicative of the occurrences of characteristics of said output falling within said second portion, and to clear in response to the signals indicative of the occurrences of characteristics of said output falling within said first portion.

28. A system according to claim 27 wherein said first portion is substantially greater than said second portion, and wherein the sum of said portions constitutes the whole of said range of measure.

29. A system according to claim 28 wherein said memory devices are constituted by stepping relays each having a stepping circuit and a homing circuit.

30. An automatic gage for gaging in succession a plurality of workpieces having a bore to be measured comprising: clamping means for maintaining a workpiece in gaging position, a fluid gage having a plug sensing element mounted for reciprocatory movement between a normal non-gaging position remote from said clamping means and a gaging position within the bore of said workpiece in non-contacting relation therewith, control means actuated by the presence of a workpiece in gaging position in said clamping means for reciprocating said sensing element from non-gaging position to gaging position for gaging the diameter of the bore then returning said element to non-gaging position and finally releasing said workpiece from said clamping means, said clamping means including a clamping surface positioned above a workpiece, and means positioned therebelow for moving said workpiece upwardly against said clamping surface into gaging position, said latter means being actuated by the presence of a workpiece to move said workpiece into gaging position and by said control means to lower said workpiece from gaging position.

31. An automatic gage for gaging in succession a plurality of workpieces having a bore to be measured comprising: clamping means for maintaining a workpiece in gaging position, a fluid gage having a plug sensing element mounted for reciprocatory movement between a normal non-gaging position remote from said clamping means and a gaging position within the bore of said workpiece in non-contacting relation therewith, control means actuated by the presence of a workpiece in gaging position in said clamping means for reciprocating said sensing element from non-gaging position to gaging position for gaging the diameter of the bore then returning said element to non-gaging position and finally releasing said workpiece from said clamping means, said clamping means including a clamping surface positioned at one side of a workpiece and means positioned at the other side of said workpiece for moving said workpiece in a sidewise direction against said clamping surface, said latter means being actuated by the presence of a workpiece to move said workpiece into clamping position and by said control means to release said workpiece from the clamped position.

References Cited in the file of this patent

UNITED STATES PATENTS

| 2,160,476 | Kampmeier | May 30, 1930 |
| 2,271,717 | Schwartz | Feb. 3, 1942 |
| 2,472,968 | Goldberg | June 14, 1949 |
| 2,664,557 | Sargrove | Dec. 29, 1953 |
| 2,712,408 | Weber | July 5, 1955 |